United States Patent
Henry

(10) Patent No.: US 11,323,715 B2
(45) Date of Patent: May 3, 2022

(54) METHOD FOR DECODING AN IMAGE, ENCODING METHOD, DEVICES, TERMINAL EQUIPMENT AND ASSOCIATED COMPUTER PROGRAMS

(71) Applicant: FONDATION B-COM, Cesson Sevigne (FR)

(72) Inventor: Felix Henry, Saint Gregoire (FR)

(73) Assignee: FONDATION B-COM, Cesson Sevigne (FR)

(*) Notice: Subject to any disclaimer, the term of this patent is extended or adjusted under 35 U.S.C. 154(b) by 0 days.

(21) Appl. No.: 16/616,252

(22) PCT Filed: Jun. 12, 2018

(86) PCT No.: PCT/EP2018/065563
§ 371 (c)(1),
(2) Date: Nov. 22, 2019

(87) PCT Pub. No.: WO2019/015884
PCT Pub. Date: Jan. 24, 2019

(65) Prior Publication Data
US 2020/0137393 A1    Apr. 30, 2020

(30) Foreign Application Priority Data

Jun. 29, 2017  (FR) .................................. 1756072

(51) Int. Cl.
*H04B 1/66* (2006.01)
*H04N 7/12* (2006.01)
(Continued)

(52) U.S. Cl.
CPC ........... *H04N 19/13* (2014.11); *H04L 65/607* (2013.01); *H04N 19/119* (2014.11); *H04N 19/176* (2014.11); *H04N 19/64* (2014.11)

(58) Field of Classification Search
CPC ............................... H04N 19/13; H04N 19/91
See application file for complete search history.

(56) References Cited

U.S. PATENT DOCUMENTS

| 2012/0033731 A1* | 2/2012 | Yamamoto ............. H04N 19/12 375/240.12 |
| 2013/0044808 A1 | 2/2013 | Nakagawa et al. |

(Continued)

FOREIGN PATENT DOCUMENTS

| EP | 2418855 A1 | 2/2012 |
| FR | 3023112 A1 | 1/2016 |

OTHER PUBLICATIONS

Rajankar, S., & Talbar, S.. Generalized false discovery rate based adaptive thresholding approach for ECG signal compression doi: http://dx.doi.org/10.1109/MedCom.2014.7006016 (Year: 2014).*

(Continued)

*Primary Examiner* — Fabio S Lima
(74) *Attorney, Agent, or Firm* — David D. Brush; Westman, Champlin & Koehler, P.A.

(57) ABSTRACT

A method for decoding an encoded data stream representative of at least one image, which is divided into blocks. The decoding method includes, for a current block: evaluating a plurality of value hypotheses of at least one description element of the current block, by calculating a likelihood measurement per hypothesis; calculating a disparity in the likelihood measurements obtained; determining at least one parameter of a decoder based on the calculated disparity; decoding, using the determined decoder, complementary information for identifying at least one of the hypotheses; and identifying at least one of the hypotheses using the decoded complementary information and obtaining a value of the at least one description element for the current block, from the at least one identified hypothesis.

20 Claims, 15 Drawing Sheets

Figure 1:
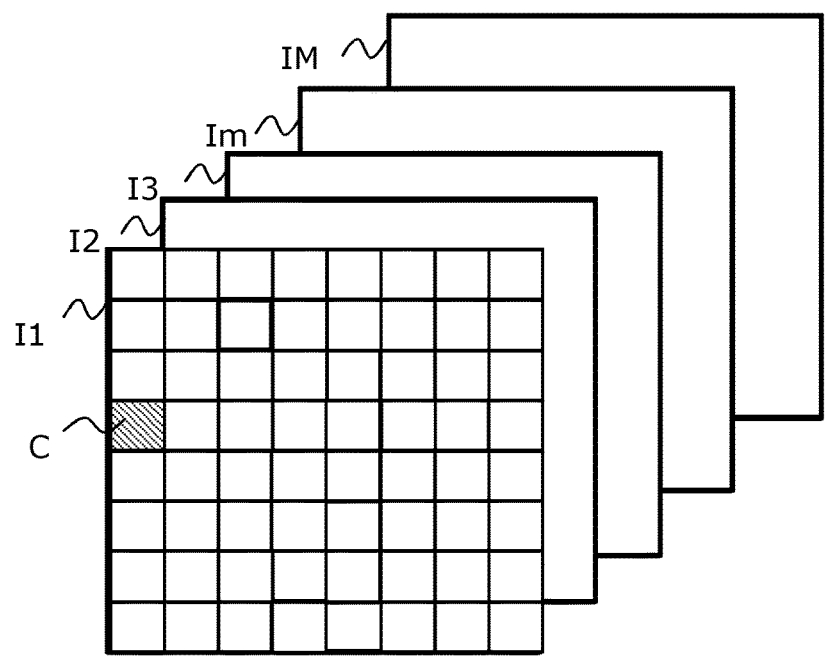

(51) Int. Cl.
> *H04N 11/02* (2006.01)
> *H04N 11/04* (2006.01)
> *H04N 19/13* (2014.01)
> *H04N 19/119* (2014.01)
> *H04N 19/176* (2014.01)
> *H04N 19/64* (2014.01)
> *H04L 65/60* (2022.01)

(56) References Cited

U.S. PATENT DOCUMENTS

| | | | |
|---|---|---|---|
| 2014/0348235 A1 | 11/2014 | Yamamoto et al. | |
| 2016/0219290 A1 | 7/2016 | Zhao et al. | |
| 2017/0142444 A1 | 5/2017 | Henry | |
| 2017/0214941 A1* | 7/2017 | Wang | H04N 19/597 |
| 2017/0359583 A1* | 12/2017 | Thirumalai | H04N 19/157 |
| 2018/0352230 A1* | 12/2018 | He | H04N 19/182 |
| 2020/0128239 A1* | 4/2020 | Henry | H04N 19/107 |

OTHER PUBLICATIONS

Verbist, F., Deligiannis, N., Jacobs, M., Barbarien, J., Schelkens, P., Munteanu, A., & Cornelis, J. Probabilistic motion-compensated prediction in distributed video coding. Multimedia Tools and Applications, 66(3), 405-430. doi:http://dx.doi.org/10.1007/s11042-012-1050-z(Year: 2013).*

International Search Report dated Sep. 6, 2018 for corresponding International Application No. PCT/EP2018/065563, filed Jun. 12, 2018.

Written opinion of the International Searching Authority dated Sep. 6, 2018 for corresponding International Application No. PCT/EP2018/065563, filed Jun. 12, 2018.

English translation of the Written opinion of the International Searching Authority dated Sep. 21, 2018 for corresponding International Application No. PCT/EP2018/065563, filed Jun. 12, 2018.

French Search Report and Written Opinion for corresponding French Application No. 1756072, filed Jun. 29, 2017.

Howard P. G. et al., "New Methods for Lossless Image Compression Using Arithmetic Coding", Data Compression Conference, 1991, DCC '91. Snowbird, UT, USA 8-11 Apr. 1, Los Alamitos, CA, USA, IEEE Comput. Soc, US, Apr. 8, 1991 (Apr. 8, 1991), pp. 257-266, XP010034245.

Sole et al., "Transform Coefficient Coding in HEVC", IEEE Transactions on Circuits and Systems for Video Technology, vol. 22, Issue: 12, pp. 1765-1777, Dec. 2012.

Koyama J. et al., "Coefficient sign bit compression in video coding", 2012 Picture Coding Symposium (PCS 2012): Krakow, Poland, May 7-9, 2012; [Proceedings], IEEE, Piscataway, NJ, May 7, 2012 (May 7, 2012), pp. 385-388, XP032449909.

Marpe, Detlev, et al., "Context-Based Adaptive Binary Arithmetic Coding in the H.264/AVC Video Compression Standard", IEEE Transactions on Circuits and Systems for Video Technology, vol. X, No. Y, Month 2003, 18 pages.

* cited by examiner

METHOD FOR DECODING AN IMAGE, ENCODING METHOD, DEVICES, TERMINAL EQUIPMENT AND ASSOCIATED COMPUTER PROGRAMS

CROSS-REFERENCE TO RELATED APPLICATIONS

This Application is a Section 371 National Stage Application of International Application No. PCT/EP2018/065563, filed Jun. 12, 2018, the content of which is incorporated herein by reference in its entirety, and published as WO 2019/015884 on Jan. 24, 2019, not in English.

1. FIELD OF INVENTION

The field of invention is the encoding and decoding of images or image sequences, including video streams.

More precisely, the invention concerns the compression of images or image sequences using a block representation of images.

The invention may in particular apply to image or video encoding implemented in current or future encoders (JPEG, MPEG, H.264, HEVC, etc. and their amendments), and to the corresponding decoding.

2. PRIOR ART

We consider a classic compression scheme of a digital image, according to which the image is divided into blocks of pixels. A current block to be encoded is predicted from a previously decoded encoded block. A residual block is obtained by subtracting the original values from the predicted values. It is then transformed using a DCT (Discrete Cosine Transform) or wavelet transformation. The transformed coefficients are quantized and then their amplitudes are subjected to Huffmann-type entropic or arithmetic encoding. Such encoding achieves efficient performance because, due to the transformation, the values of the amplitudes to be encoded are overwhelmingly zero.

On the other hand, it does not apply to the values of the signs of the coefficients, whose + and − values are generally associated with equivalent probabilities of occurrence. Thus, the signs of the coefficients are encoded by a bit 0 or 1.

The French patent application published under number FR3023112 is known for selecting the signs of the coefficients to be predicted in the current block according to a score associated with a coefficient encoding context, the score being representative of a level of reliability of a sign prediction.

An advantage is that it is ensured that for a large majority of the predicted signs, the prediction indicator will indicate a correct prediction and thus provide a context favourable to entropic encoding. In this way, compression performance is increased.

A disadvantage of this method is that the entropic encoder used is the same regardless of the sequence of signs to be predicted.

3. SUMMARY

An aspect of the present disclosure relates to a method for decoding an encoded data stream representative of at least one image, said image being divided into blocks, the decoding method comprising, for the current block, the following steps:

Evaluating a plurality of value hypotheses of at least one description element of the current block, by calculating a likelihood measurement by hypothesis, said calculation being the same as that used to encode the data bitstream;

Calculating a disparity in the likelihood measurements obtained;

Determining at least one parameter of a decoder as a function of the calculated disparity, said at least one parameter belonging to a group comprising at least:
  a parameter comprising a context associated with an adaptive binary arithmetic decoder;
  a parameter comprising a probability associated with the complementary information;
  a parameter comprising an identifier of a predetermined decoder;

Decoding, using an entropic decoder configured by said at least one parameter, a complementary information for identifying at least one of said hypotheses; and Identifying one of the hypotheses using at least the decoded complementary information and obtaining the value of said at least one description element for the current block, from the identified hypothesis.

A block description element is any information, parameter or feature intended to be encoded and transmitted in the data stream, from which the decoder can reconstruct pixel values from the image.

With the invention, the decoder evaluates a plurality of value hypotheses of at least one description element of the current block using a likelihood measurement and calculates a disparity of these measurements. The calculated disparity is used to determine the entropic decoder to be used to decode encoded information transmitted in the stream, said information being complementary to at least one of said hypotheses.

The encoding is thus adapted to the particular statistics of this information transmitted by the encoder to the decoder, which makes it possible to improve compression performance.

Correspondingly, the invention also concerns a method for encoding a data stream representative of at least one image, said image being divided into blocks, characterised in that it comprises the following steps, implemented for a current block:

For a plurality of value hypotheses of at least one description element of the current block, obtaining a likelihood measurement by hypothesis;

Calculating a disparity in the likelihood measurements obtained;

Determining at least one parameter of an encoder as a function of the calculated disparity, said at least one parameter belonging to a group comprising at least:
  a parameter comprising a context associated with an adaptive binary arithmetic encoder;
  a parameter comprising a probability associated with the complementary information;
  a parameter comprising an identifier of a predetermined encoder;

Identifying at least one hypothesis and determining a complementary information for identifying said at least one of the hypotheses;

Coding said complementary information using an entropic encoder configured by said at least one parameter; and Inserting encoded information into the bitstream.

The different modes of implementation that will now be described concern both the decoding method and the decoding method.

Depending on one aspect of the invention, said at least one parameter comprises a context associated with an adaptive arithmetic encoder or decoder.

For example, it is a CABAC (Context-adaptive binary arithmetic encoding) encoder. The context of this encoder corresponds, for example, to that described in the article Marpe, D., Schwarz, H., and Wiegand, T., Context-Based Adaptive Binary Arithmetic encoding in the H.264/AVC Video Compression Standard, IEEE Trans. Circuits and Systems for Video Technology, Vol. 13, No. 7, pp. 620-636, July, 2003, i.e. a parameter setting of an entropic encoder that minimises the encoding rate of a particular source associated with a particular probability distribution.

An advantage is to define an encoding/decoding context specifically adapted to the complementary information determined for the current block.

According to another aspect of the invention, said at least one parameter includes a probability associated with the complementary information.

Advantageously, this probability is used to initialise the CABAC context used to encode/decode the complementary information determined for the current block.

Another aspect is that the process comprises an identifier of a predetermined encoder or decoder.

An advantage is that the encoder or decoder can thus execute the encoder/decoder best suited to the complementary information.

Yet another aspect of the invention is that the method comprises a step of ranking the hypotheses in descending order of likelihood, the complementary information comprises a ranking in the ranking and the value of said at least one element of description corresponds to the hypothesis ranked in that ranking.

In this embodiment of the invention, the complementary information makes it possible to identify the hypothesis of combinations of values that correspond to the element of description.

The invention exploits the disparity in the likelihood measurements of the different hypotheses to determine the most suitable encoder/decoder for the rank information.

An advantage of this embodiment is that the complementary information is much smaller than the element of description, which makes it possible to achieve a substantial gain in compression.

According to yet another aspect, the method also comprises a step of predicting the value of said at least one description element by selecting the value hypothesis associated with the highest likelihood measurement, called the predicted value, and the complementary information comprises a difference between the predicted value and the value of the description element, called the residual value.

In this embodiment, the decoder reproduces the operation of the encoder to determine the best hypothesis in the sense of a likelihood criterion. It then decodes the complementary information that represents the difference in value between the chosen hypothesis and the true value of the description element.

This embodiment is particularly well suited to the prediction of signs, for which the residual value is small and has non-uniform distribution values.

According to another aspect of the invention, the method evaluates a plurality of hypotheses of a sequence of at least two description elements, for the first element of the sequence, it calculates a disparity in the likelihood measurements obtained for the plurality of hypotheses of the sequence and obtains the value of the first description element of the sequence, from that of the identified hypothesis.

Advantageously, once the first element has been processed, it is removed from the sequence and the process steps are repeated for the second element, which has become the first element of the new sequence.

The invention also concerns a device adapted to implement the decoding method according to any of the particular embodiments defined above. This device may of course comprise the different characteristics relating to the method according to the invention. Thus, the characteristics and advantages of this device are the same as those of the decoding method, and are not further detailed.

According to a particular embodiment of the invention, such a device is included in a terminal equipment.

The invention also concerns a device adapted to implement the encoding method according to any of the particular modes of implementation defined above. This device may of course comprise the different characteristics relating to the method according to the invention. Thus, the characteristics and advantages of this device are the same as those of the encoding method, and are not further detailed.

According to a particular embodiment of the invention, such a device is included in a terminal equipment.

The invention also concerns a user terminal equipment comprising a device for decoding at least one image and/or a device for encoding at least one image according to the invention.

The invention also concerns a computer program containing instructions for carrying out the steps of a method for decoding at least one image as described above, when this program is executed by a processor.

The invention also concerns a computer program containing instructions for carrying out the steps of a method for encoding at least one image as described above, when this program is executed by a processor.

These programs can use any programming language. They can be downloaded from a communication network and/or recorded on a computer-readable medium.

Finally, the invention refers to recording media, readable by a processor, whether or not integrated into the device for encoding or decoding at least one image according to the invention, which may be removable, storing a computer program using an encoding or decoding method, as described above.

4. LIST OF FIGURES

Figure 3:
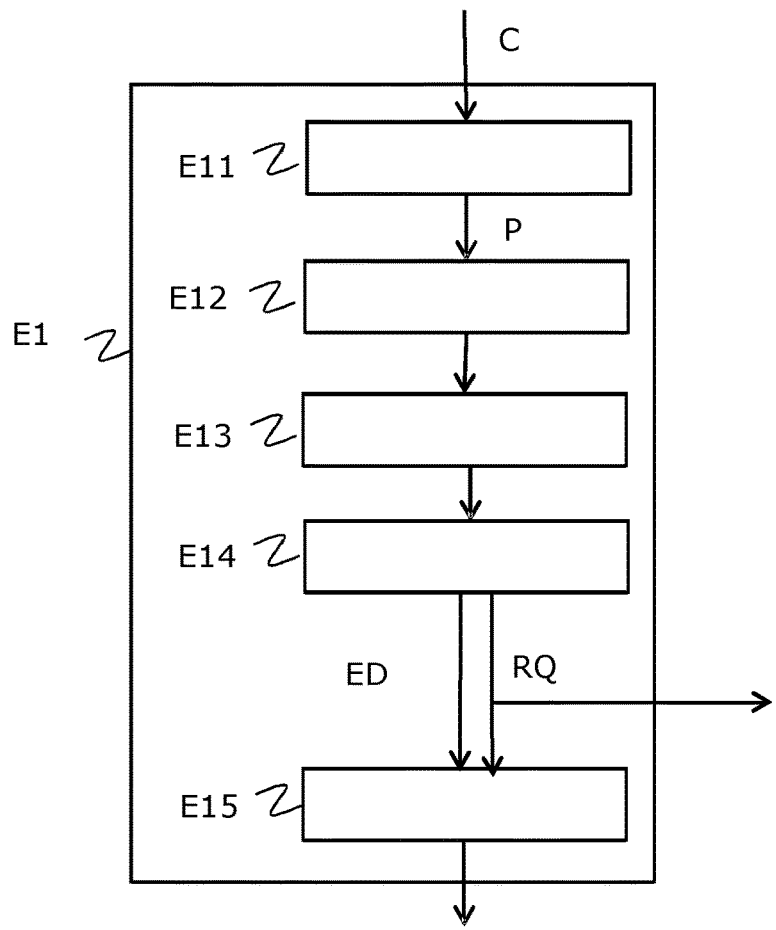
Figure 2:
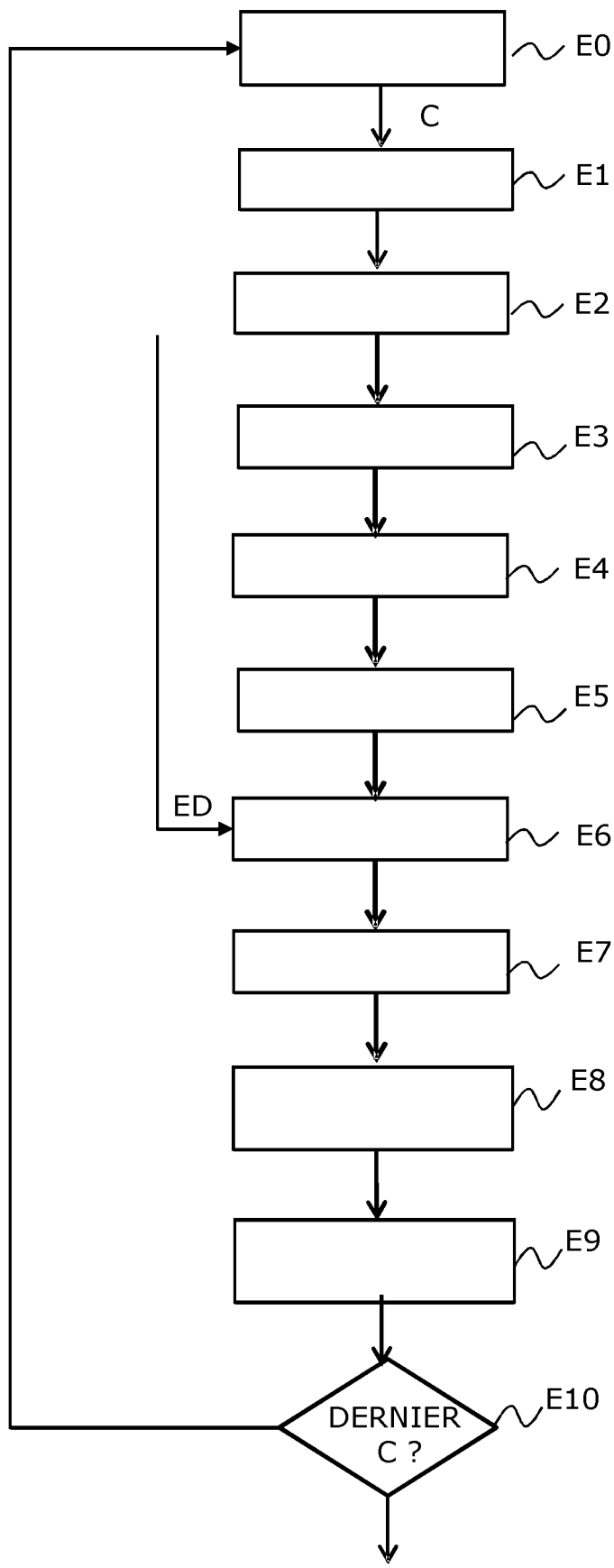
Figure 4:
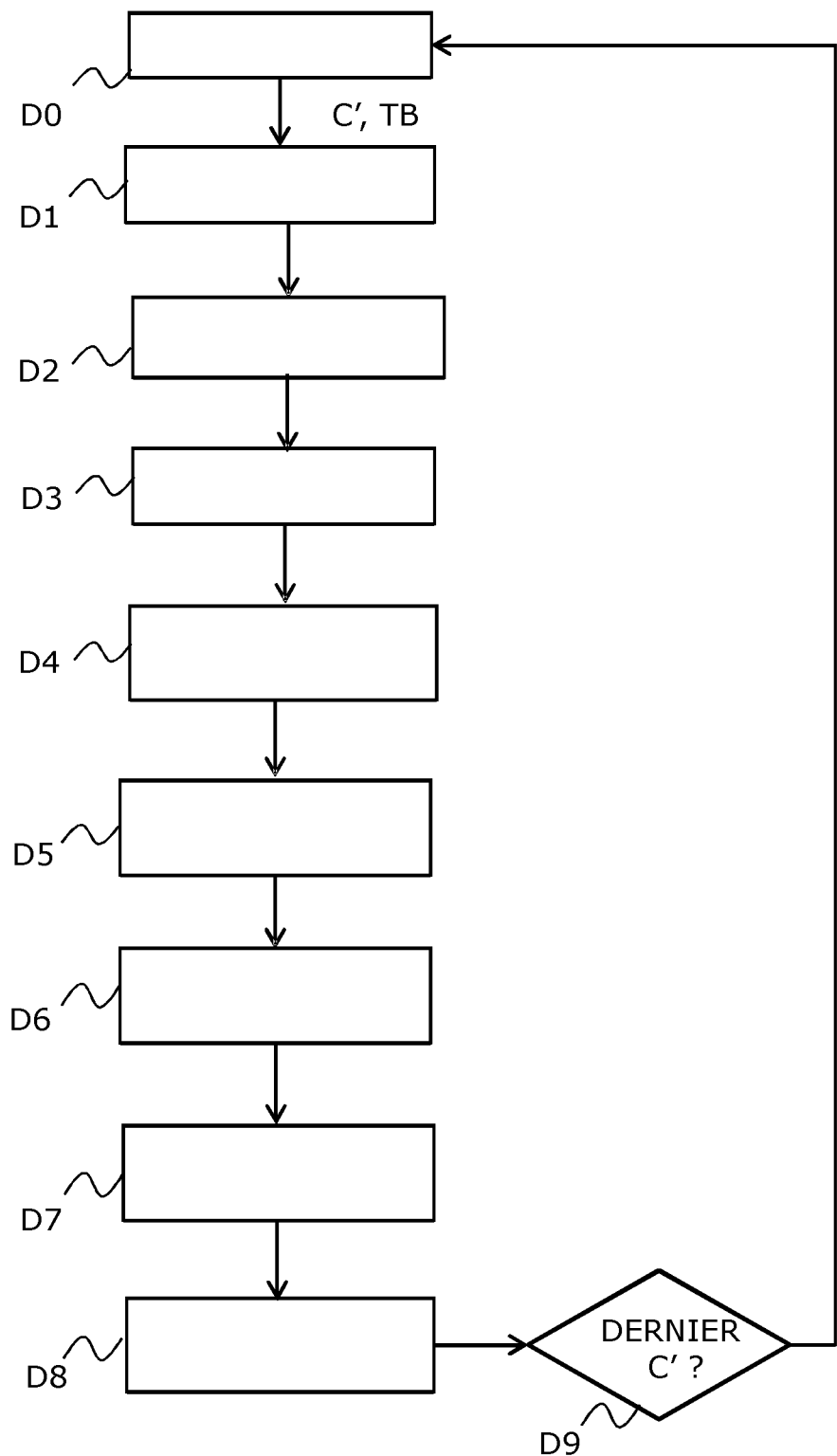
Figure 5:
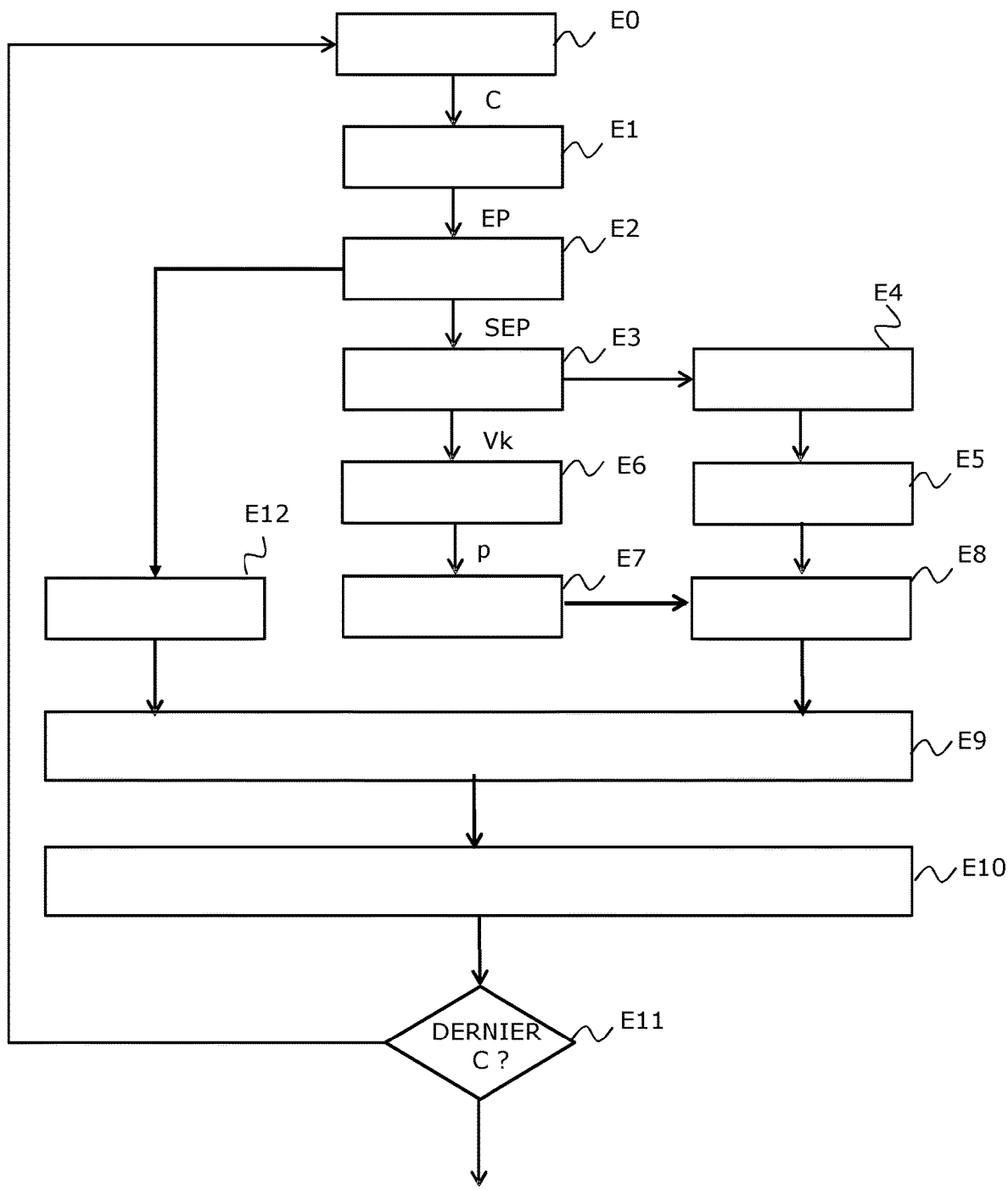
Figure 6:
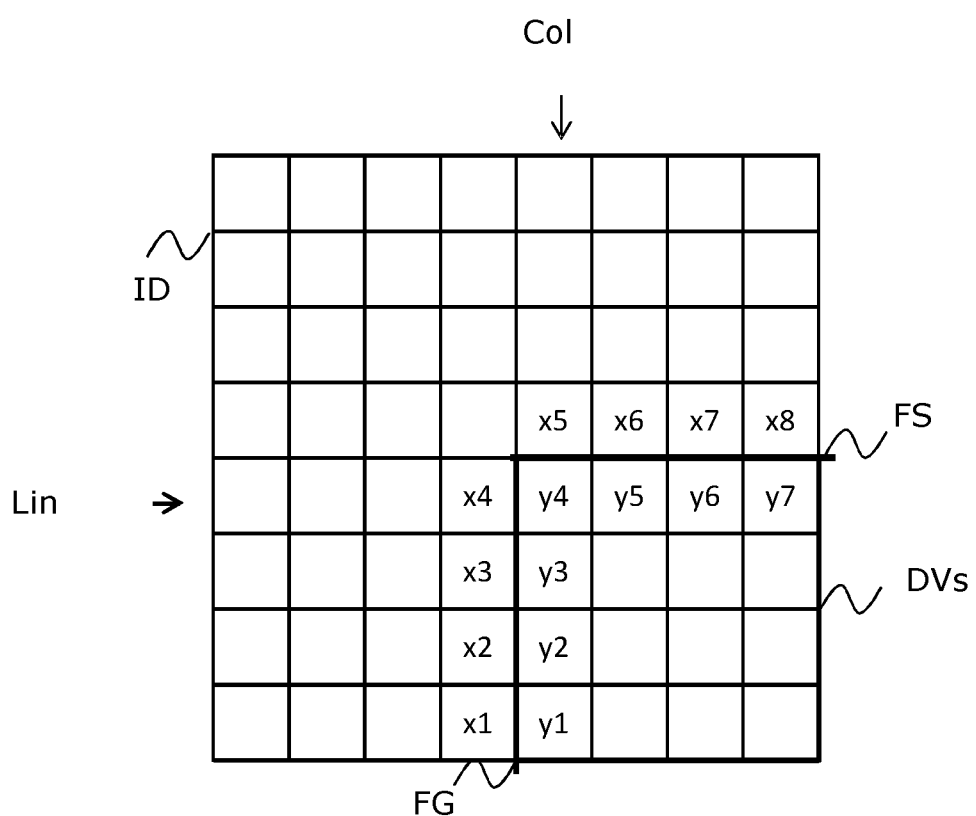
Figure 7:
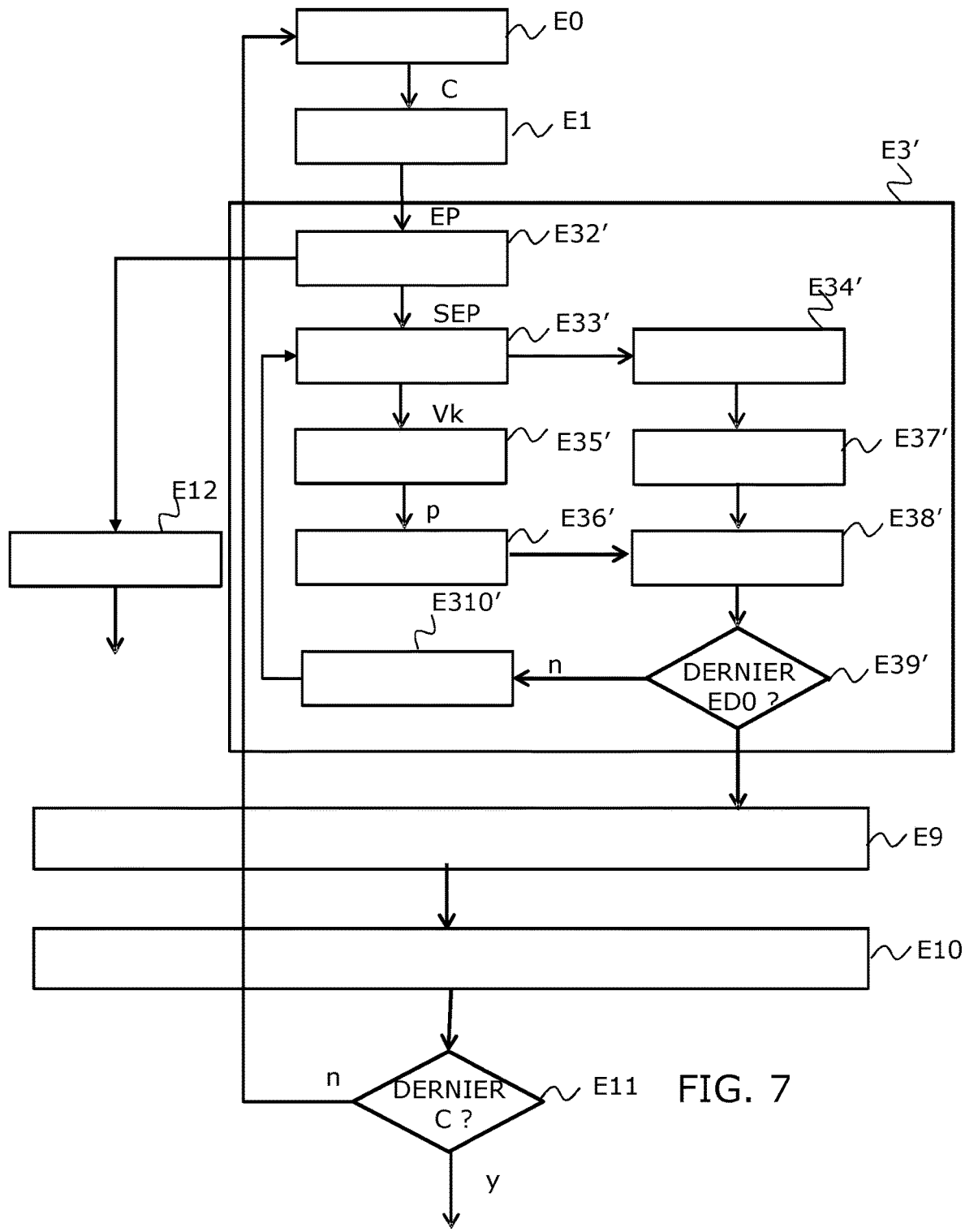
Figure 8:
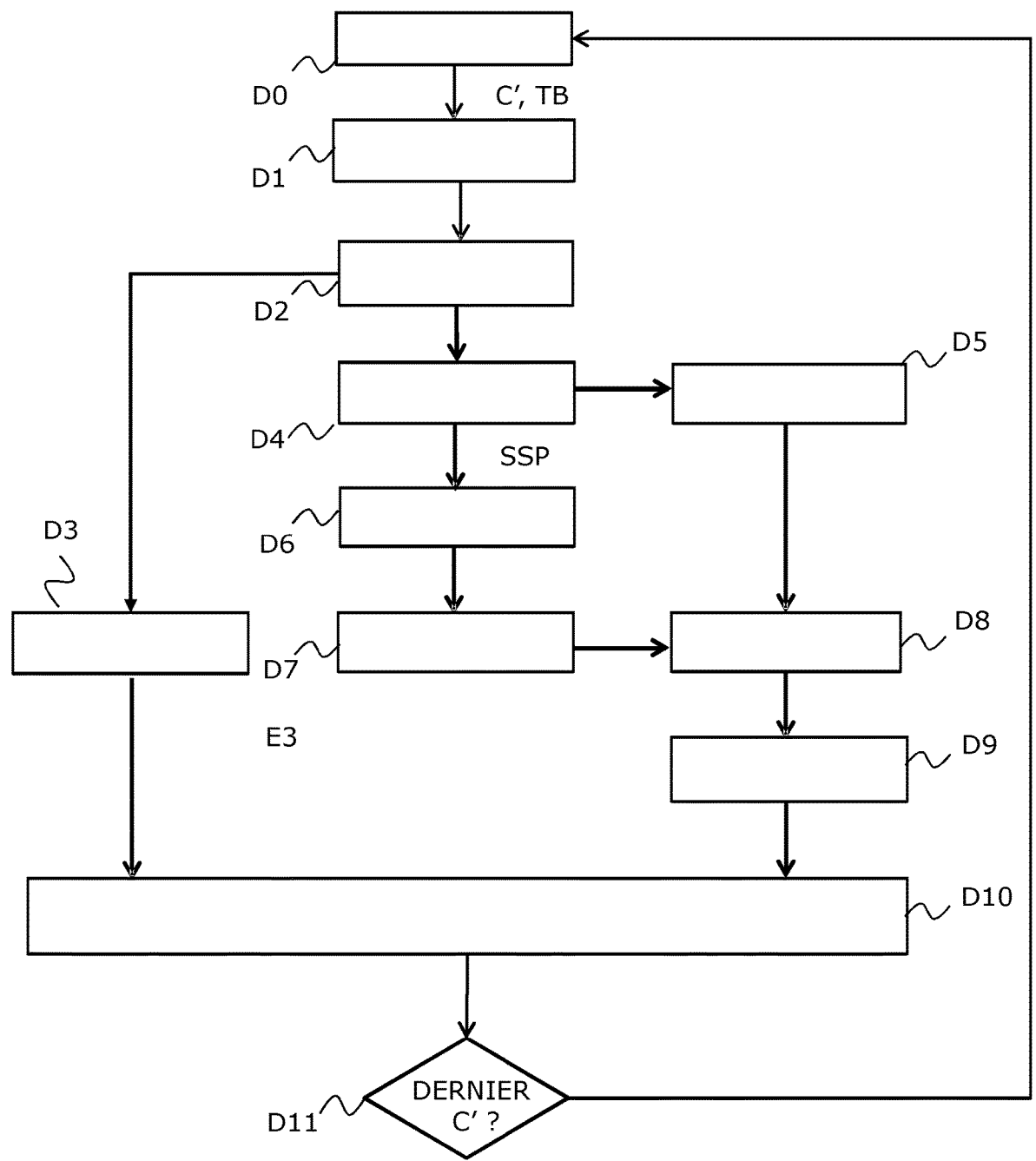
Figure 9:
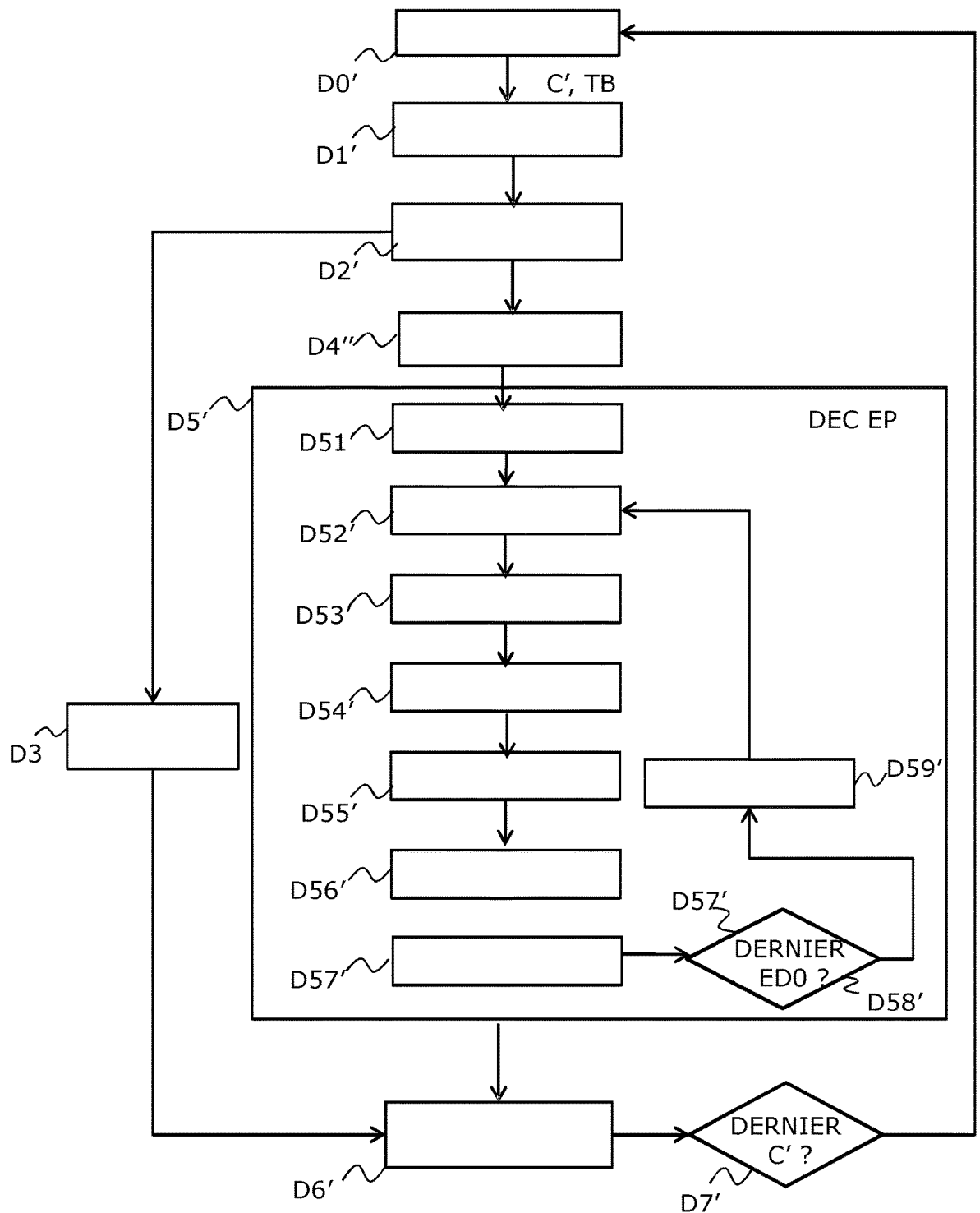
Figure 10:
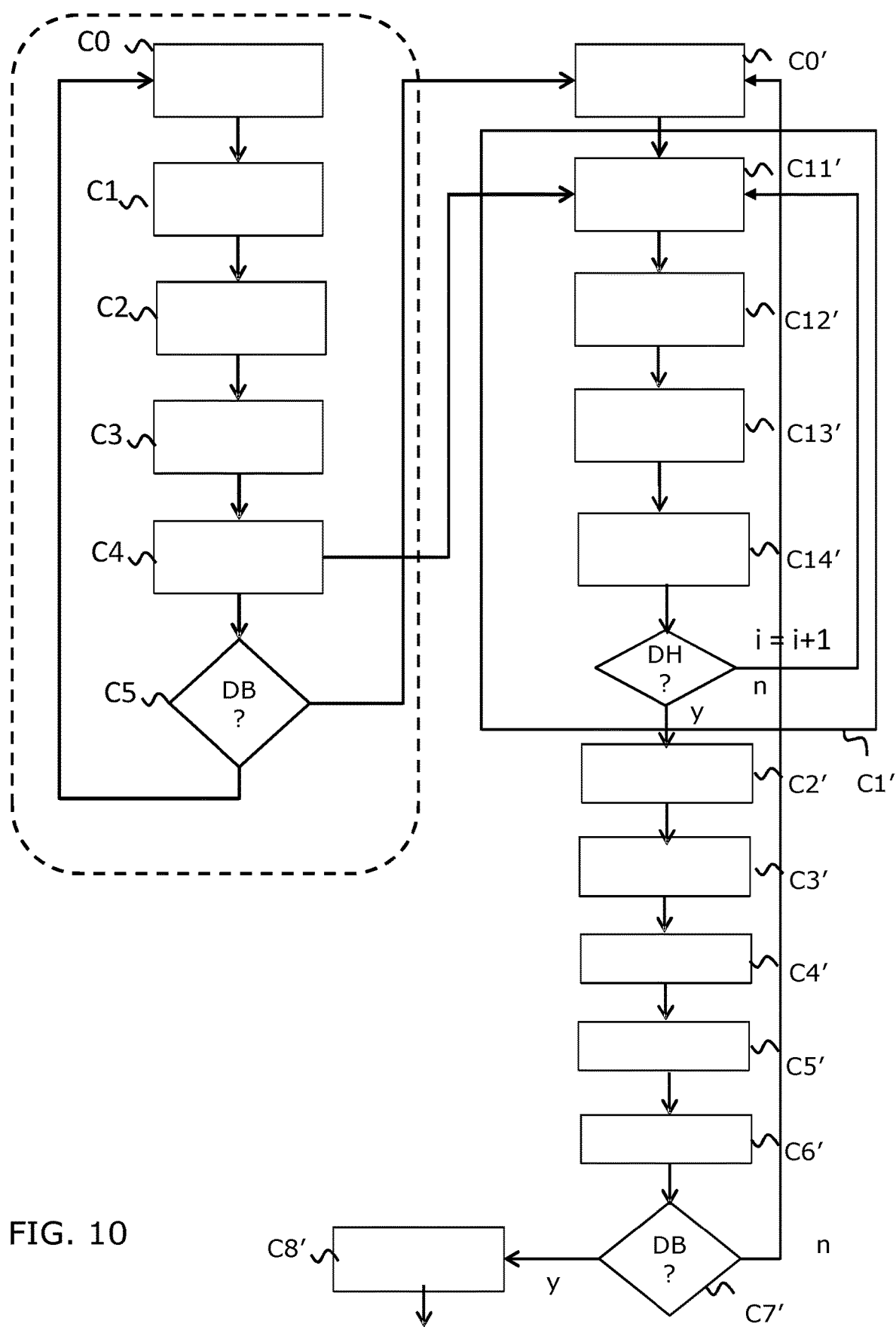
Figure 11:
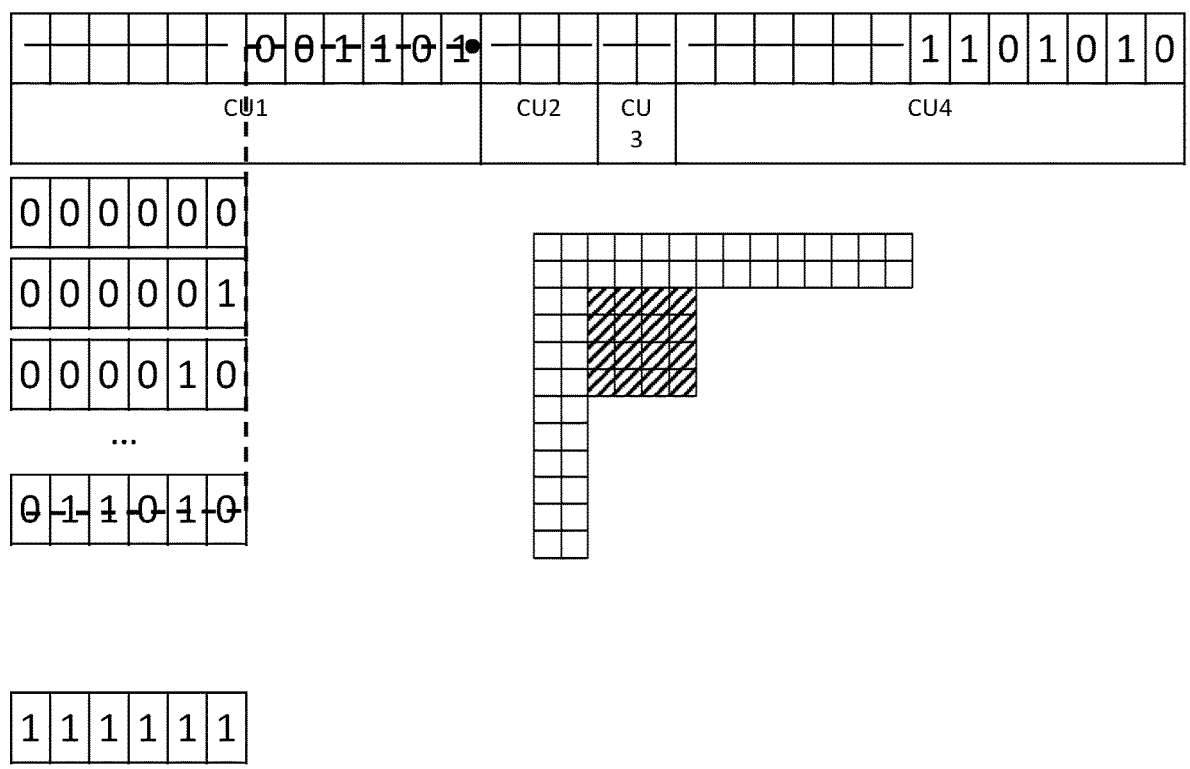
Figure 12:
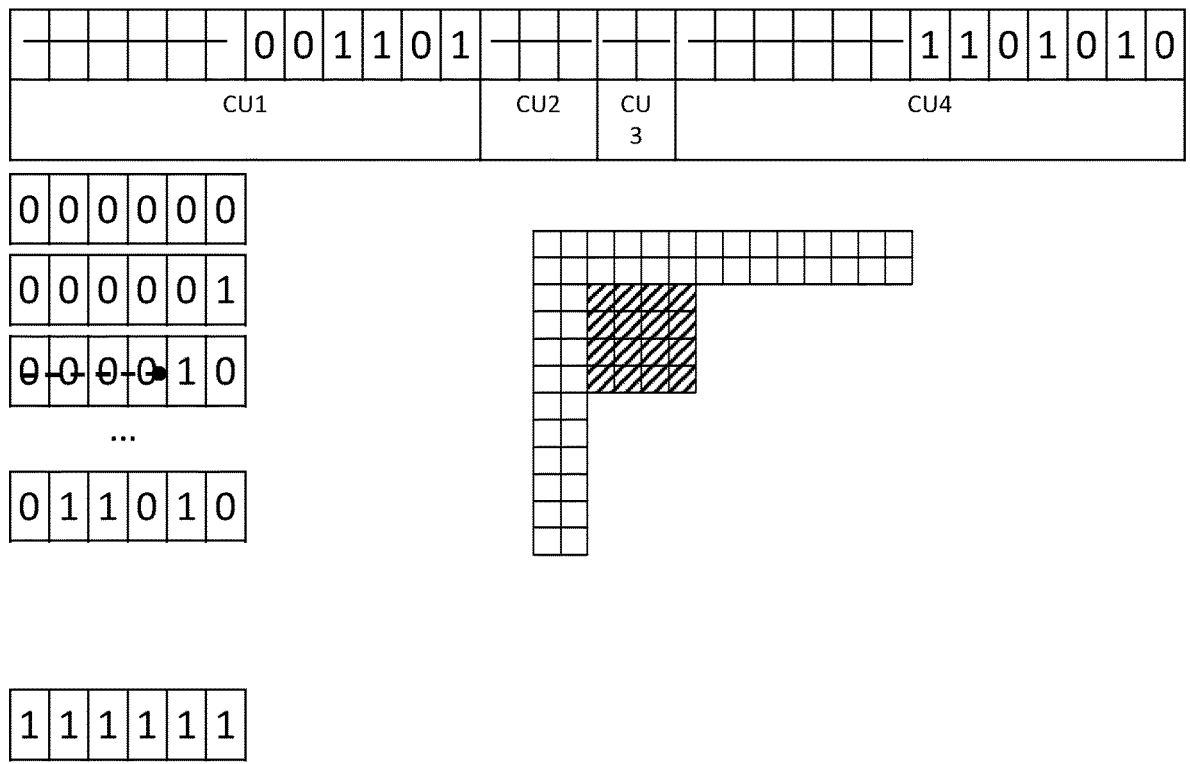
Figure 13:
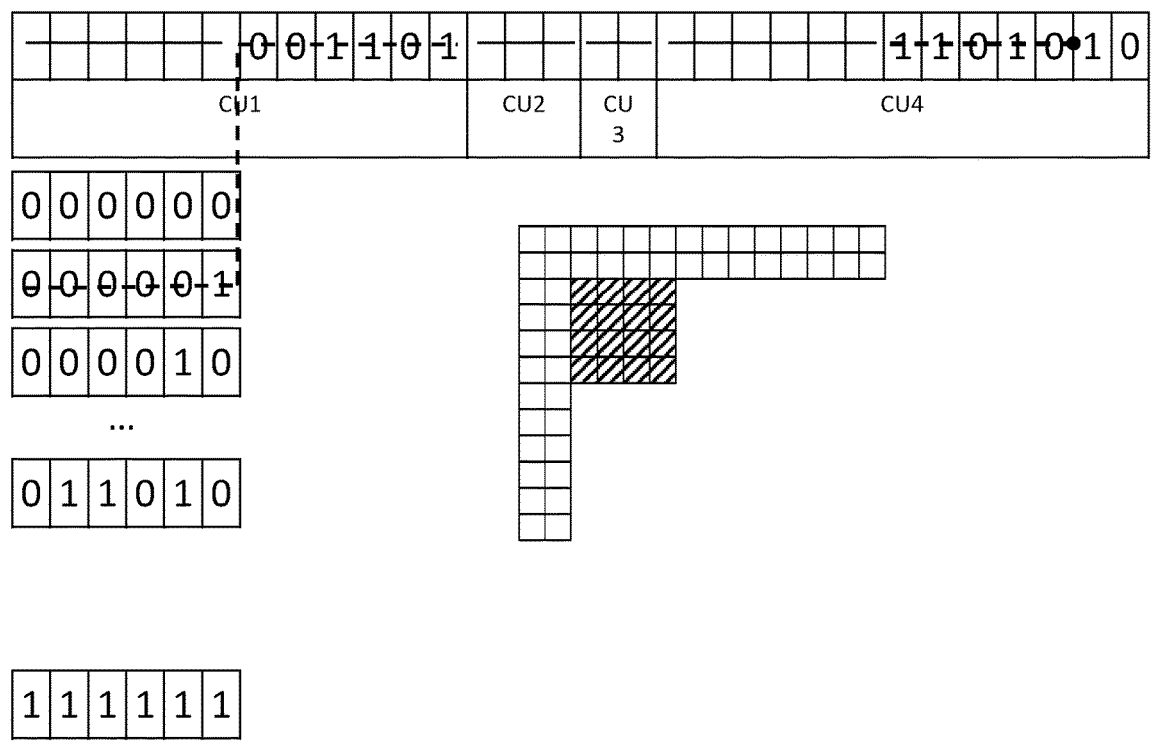
Figure 15:
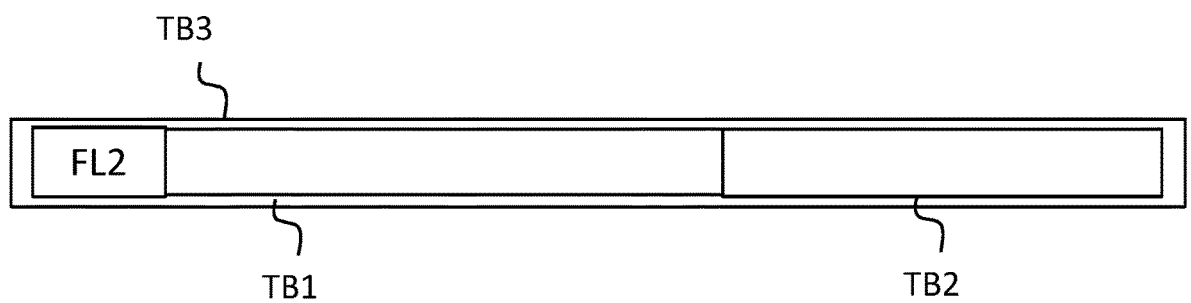
Figures 14, 17:
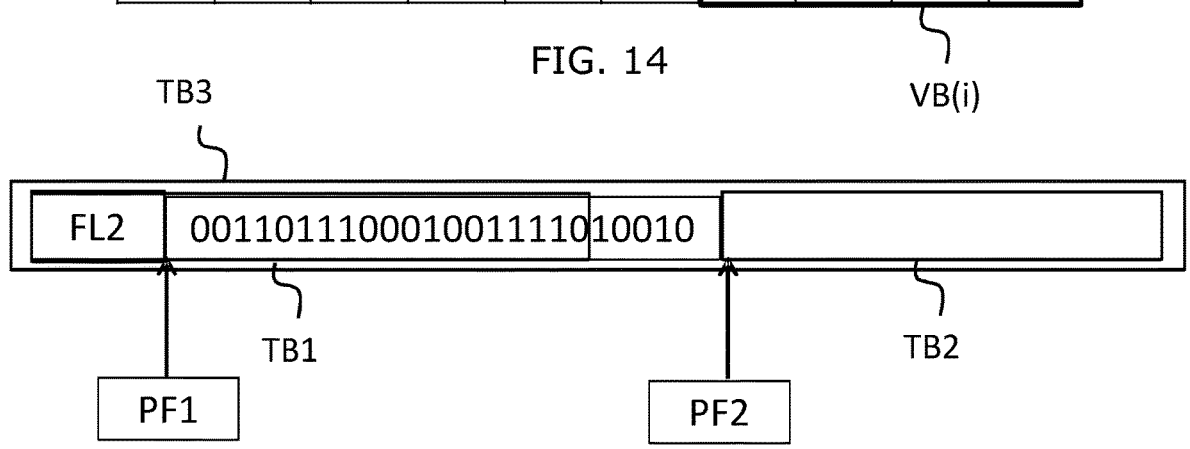
Figure 16:
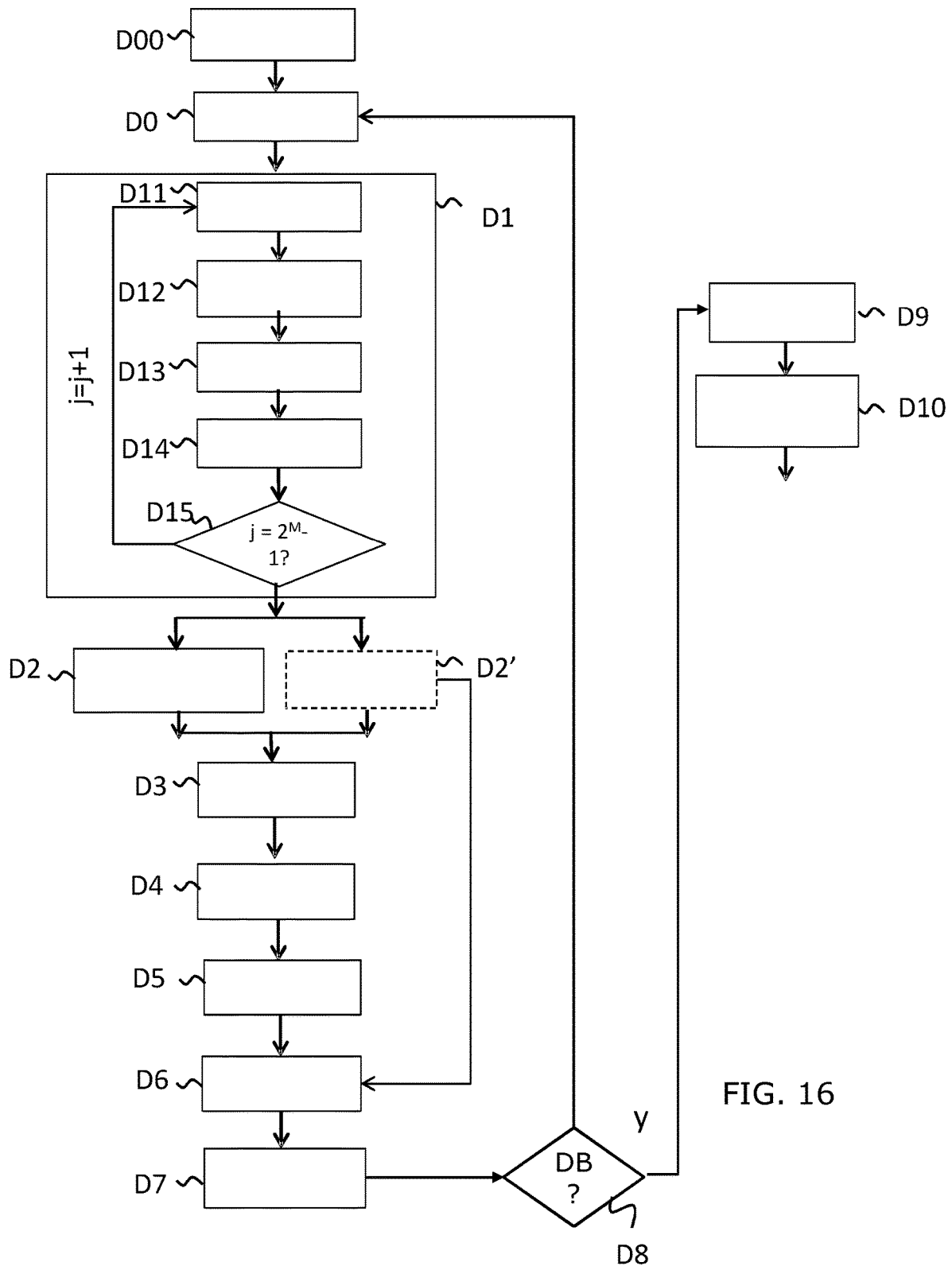
Figure 18:
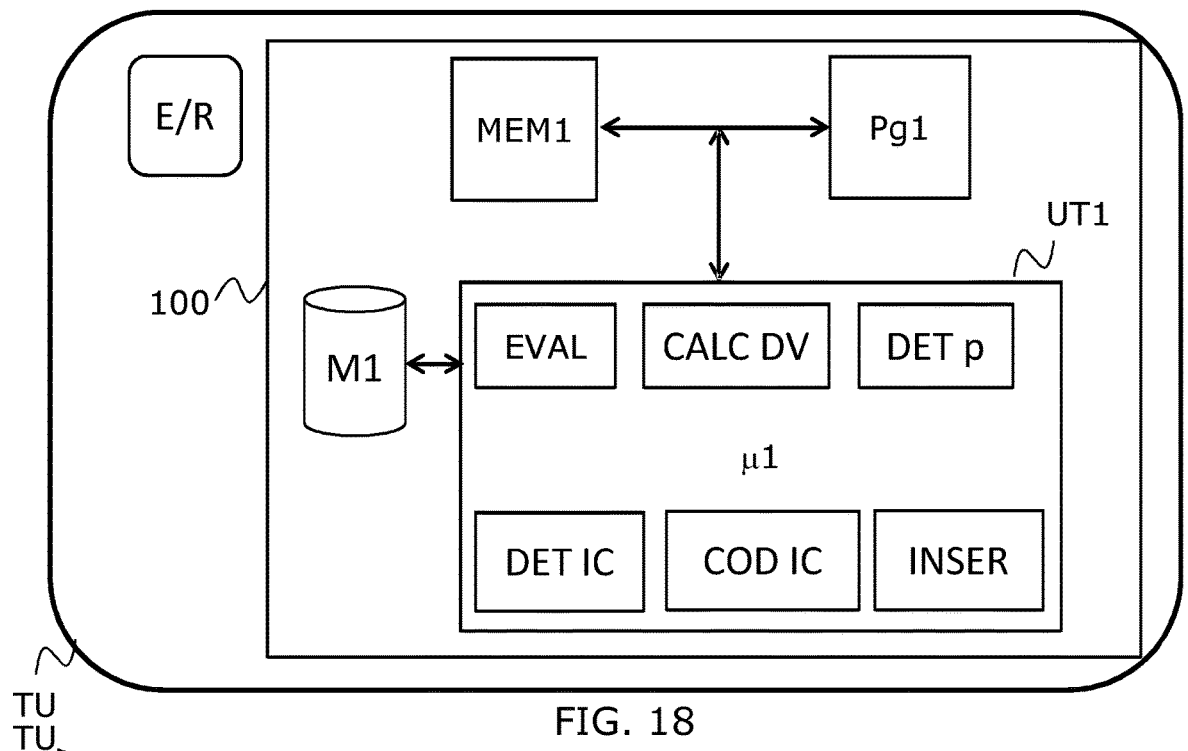
Figure 19:
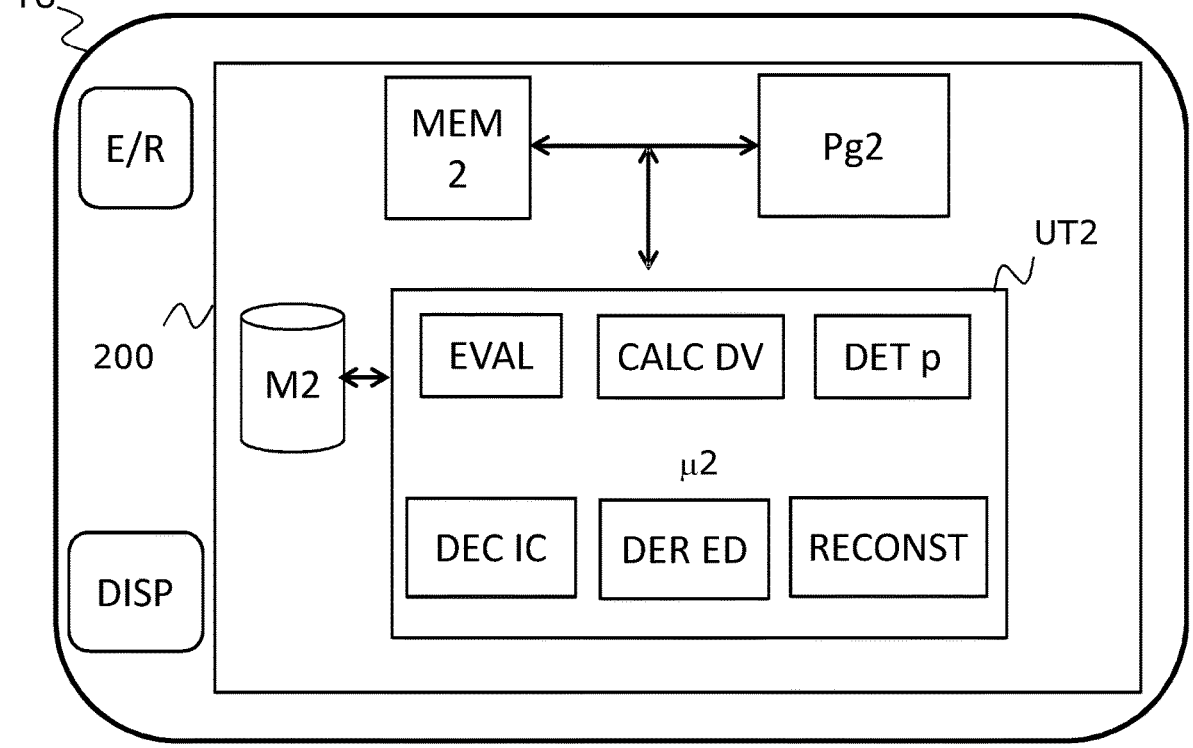

Other advantages and characteristics of the invention will become clearer when reading the following description of a particular embodiment of the invention, given as a simple illustrative and non-exhaustive example, and the annexed drawings, including:

FIG. 1 schematically illustrates a sequence of images cut into blocks;

FIG. 2 describes the steps of a method for encoding an image according to the invention;

FIG. 3 details a processing step, intended to provide a set of description elements for the current block to be encoded;

FIG. 4 describes the steps of a method for decoding an image according to the invention;

FIG. 5 describes the steps of a method for encoding an image according to a first embodiment of the invention;

FIG. 6 schematically illustrates an example of a cost measurement calculated to evaluate a likelihood measurement associated with an hypothesis for the current block according to the first embodiment of the invention;

FIG. 7 describes the steps of a method for encoding an image according to a variant of the first embodiment of the invention;

FIG. 8 describes the steps of a method for decoding an image according to the first embodiment of the invention;

FIG. 9 describes the steps of a method for decoding an image according to a variant of the first embodiment of the invention;

FIG. 10 describes the steps of a method for encoding an image according to the second embodiment of the invention;

FIGS. 11, 12 and 13 schematically illustrate the step of decoding a current block from a value hypothesis of binary elements sequence and encoded data of the first bitstream portion according to the second embodiment of the invention;

FIG. 14 schematically illustrates an example of a cost measurement calculated to evaluate a likelihood measurement associated with a hypothesis for the current block under the second embodiment of the invention;

FIG. 15 schematically illustrates a step of reading encoded data in the first and second portion of the bitstream using first and second pointers according to the second embodiment of the invention;

FIG. 16 describes the steps of a method for decoding an image according to the second embodiment of the invention;

FIG. 17 schematically illustrates an example of a data bitstream structure with first and second bitstream portions according to the invention;

FIG. 18 schematically illustrates an example of the material structure of an invention encoding device; and FIG. 19 schematically illustrates an example of the material structure of a device for decoding the invention.

5. DESCRIPTION OF A PARTICULAR EMBODIMENT OF THE INVENTION

The general principle of the invention is based on the evaluation of value hypotheses of a sequence of binary elements representative of at least part of a description element of the current block, based on the calculation of a likelihood measurement, and on the exploitation of a disparity of the calculated measurements to adapt the entropic encoding/decoding of complementary identification information of this sequence.

In relation to FIG. 1, we consider an original video consisting of a sequence of M images I1, I2, . . . IM, with a non-zero integer M. The images are encoded by an encoder, the encoded data are inserted a bitstream TB transmitted to a decoder via a communication network, or a compressed file FC, intended to be stored on a hard disk for example. The decoder extracts the encoded data, then received and decoded by a decoder in a predefined order known to the encoder and decoder, for example in time order I1, then I2, . . . , then IM, this order may differ depending on the embodiment.

When encoding an Im image, with an integer m between 1 and M, it is subdivided into blocks of maximum size which can in turn be subdivided into smaller blocks. Each block C will undergo an encoding or decoding operation consisting of a series of operations, including, but not limited to, a prediction, a calculation of the current block residue, a transformation of the pixels of the current block into coefficients, a quantization of the coefficients and an entropic encoding of the quantized coefficients. This sequence of operations will be detailed later.

The steps of the method for encoding an $I_m$ image according to the invention will now be described in relation to FIG. 2.

In E0, the first block to be processed is first selected as current block C. For example, this is the first block (in lexicographical order). This block contains N×N pixels.

In step E1, a current block C is processed by implementing an encoding scheme, for example as specified in the HEVC standard, in document "ISO/IEC 23008-2:2013—High efficiency coding and media delivery in heterogeneous environments—Part 2: High efficiency video coding", International Organization for Standardization, published in November 2013.

This processing step is intended to provide a set of ED description elements for the data to be encoded for the current block C. These description elements can be of various types. They comprise, but are not limited to, the following:

- information relating to encoding choices of the current block C, for example an encoding mode of the current block, such as INTRA, INTER or SKIP mode, a prediction mode of the current block, among the 35 prediction modes of an INTRA block, a prediction mode of a motion vector estimated for the current block, or the significance of an amplitude of a coefficient, known in itself in HEVC;
- the data values to be encoded, such as the components of a motion vector, the amplitude or the sign of a coefficient;

It is assumed that there are L cuts in possible blocks numbered from 1 to L, and that the cut used on block C is cut number I. For example, there can be 4 possible cuts, in blocks of size 4×4, 8×8, 16×16, and 32×32.

In connection with FIG. 3, an example of the sub-steps implemented by this E1 treatment of the selected current block C, in accordance with the HEVC standard, is described first.

In step E11, a prediction P of the original block C is determined. It is a prediction block built by known means, typically by motion compensation (block from a previously decoded reference image) in the case of a so-called INTER prediction, or by INTRA prediction (block built from the decoded pixels immediately adjacent to the current block in the ID image). The prediction information related to P is encoded in the TB bitstream or FC compressed file. It is assumed here that there are K possible prediction modes $M_1$, $M_2$, . . . , $M_K$, with non-zero integer K, and that the prediction mode chosen for block C is the $M_k$ mode.

In step E12, an original residue R is formed by subtracting R=C−P from the prediction P of the current block C to the current block C.

In step E13, the residue R is transformed into a transformed residue block, called RT, by a DCT-type transform or transformed into wavelets, both known to a person having ordinary skills in the art and notably implemented in the JPEG standards for the DCT and JPEG2000 for the wavelet transform.

In E14, the transformed RT residue is quantized by conventional means of quantization, e. g. scalar or vector, into a quantized RQ residue block. This quantized block RQ contains N×N coefficients. In a manner known in the state of the art, these coefficients are scanned in a predetermined order to constitute a monodimensional vector RQ[i], where the index i varies from 0 to $N^2-1$. The index i is called the frequency of the RQ coefficient[i]. Typically, these coefficients are scanned in increasing order of frequency, for example according to a zigzag path, which is known from the JPEG still image encoding standard.

At the end of step E14, therefore, a set E of data description elements to be encoded is available for the current block C, among which are the quantized transformed residual coefficients RQ[i], the signs of these coefficients, the prediction mode Mk etc.

In step E15, the amplitude information of the coefficients of the residual block RQ is encoded by entropy encoding. Entropic encoding consists of exploiting the distribution of syntax elements to reduce their throughput. For example, for a syntax element taking multiple possible values, a short binary code will be assigned to frequent values and a long binary code to rare values. This reduces, on average, the number of bits required to encode these values. The Morse code is an example of an entropic encode adapted to the statistics of letters (which in this case constitute the syntax elements) in the English language. Huffman encoding is a technique for constructing a binary code adapted to a given statistic, with the principle that each syntax element is encoded by an integer number of bits. Arithmetic encoding allows bits to be shared between several syntax elements, and thus to encode a syntax element on a non-integer number of bits.

By amplitude, we mean here the absolute value of the coefficient. For example, means of amplitude encoding are described in the HEVC standard and in the article by Sole et al, entitled "Transform Coefficient encoding in HEVC", published in the journal IEEE Transactions on Circuits and Systems for Video Technology, Volume 22, Issue: 12, pp. 1765-1777, in December 2012. Classically, we can encode for each coefficient a representative information because the coefficient is not zero. Then, for each non-zero coefficient, one or more amplitude information is encoded. We obtain the amplitudes encoded CA.

It is assumed that not all the description elements of the current block are encoded at this stage and that there is still a set of N description elements to be encoded. For example, the signs of the coefficients are not encoded.

In E2, we obtain a sequence of M description elements in this set, with M not zero integer, M less than or equal to N, representative of a part, one or more description elements of the current block from this set E.

In E3, we consider the plurality of possible value hypotheses for the sequence of M binary elements obtained. They are evaluated by calculating a likelihood measurement by hypothesis.

In E4, a disparity in the likelihood measurements obtained is calculated and at least one parameter of an entropic encoder is determined in E5 as a function of the calculated disparity.

In E6, a complementary information is determined to identify at least one hypothesis of the plurality of hypotheses.

In E7, this complementary information is encoded using the determined encoder and the encoded information is inserted into the bitstream.

In E8, the current block C is rebuilt.

In E9, the encoded data for block C is inserted into the bitstream and tested in E10 if there is still a block C to be processed. If so, repeat steps E1 to E10. Otherwise we've finished processing.

The bitstream TB produced by the method according to the invention is intended to be presented as an input to a local or remote decoder. For example, a signal carrying the bitstream is transmitted to the decoder via a communication network.

In relation to FIG. 4, the steps of a decoding method are described according to the invention.

In D0, a current block C' is selected to be decoded.

In D1, the current block C' is processed by implementing the decoding scheme, corresponding to the encoding scheme used by the encoder, for example as specified in the HEVC standard. In particular, during this step, a set of ED elements for describing the data to be decoded for the current block C' is identified.

In D2, at least one description element of the current block is selected in this set.

In D3, a plurality of value hypotheses of said at least one description element selected are evaluated on the basis of a likelihood measurement by hypothesis.

In D4, a disparity in the likelihood measurements obtained is calculated.

In D5, at least one parameter of a decoder is determined as a function of the calculated DV disparity.

In D6, information representative of a value of at least one description element is decoded using the decoder determined.

In D7, the value of said at least one description element for the current block is obtained from one of the hypotheses tested, the likelihood measurements obtained and the decoded information.

In D8, the block is reconstructed using the value of said at least one description element.

In D9, we test if there are any blocks left in the image to decode. If this is the case, steps D0 to D9 are repeated.

7.1 DESCRIPTION OF A FIRST EMBODIMENT OF THE INVENTION

7.1.1.1 Encoding Method According to the First Embodiment of the Invention

In the exemplary embodiment of the invention which will now be detailed in relation to FIG. 5, we consider description elements of a particular type, for example signs of transformed and quantized coefficients of the current block RQ. Of course, the invention is not limited to this type of element and applies to any other element of the description of the current block. Other examples will be presented below.

In step E2, a sequence of description elements of the current block to be predicted is selected.

For example, we start by defining an initial subset of description elements to predict. For example, these are all the signs of the non-zero RQ[i] quantized transformed residual coefficients of the current block.

In an advantageous way, we exploit the knowledge of a context $Cx_j$ associated with each coefficient among a plurality of predetermined contexts J, with J being a non-zero integer and j being an integer between 1 and J. Such a context is defined by at least one characteristic of the coefficient or block from which it is derived.

In an advantageous way, the following characteristics are considered:
  the size of the quantized residual block RQ,
  the amplitude of the quantized coefficient RQ[i],
  the frequency of the coefficient or index i in the RQ block,
  the prediction mode of the current block $M_k$ among the K possible modes.

Indeed, the higher the amplitude, the more reliable the prediction of the sign is. Similarly, it was found that when the block is larger in size, the frequency of the coefficient is lower, the prediction is more reliable. Finally, it was found that prediction is more reliable when the current block is associated with an intra prediction of a certain type.

Alternatively, other contexts are possible. Thus, it is possible to take into account the type of image in which the current block is located, for example the Intra or Inter type, known from the HEVC standard, as a function of the energy of the predictor P, or as a function of the total number of non-zero coefficients in the current block.

Then, the signs of the coefficients of the RQ block of the initial set are selected, according to a predetermined score $S_j$, for the context $Cx_j$ associated with the RQ coefficient[i] considered.

Such a score $S_j$ is representative of a level of reliability of the prediction of the sign of the RQ coefficient[i].

For example, the $S_j$ score takes values from a predetermined set, for example from 0 to 10.

According to one variant, the score is a simple binary indication, one of the two values of which indicates that the sign can be predicted, and the other that the sign cannot be predicted.

According to another variant, the $S_j$ scores correspond to a priori known probabilities, depending on the $Cx_j$ context associated with the RQ coefficient[i]. In the encoder, there is a set of probabilities of correct detection of the signs of the RQ coefficients. For example, this set of probabilities is stored in memory.

These probabilities were constructed before encoding and decoding, either by statistical accumulation on a set of signals representative of the signals to be encoded, or by mathematical calculation based on hypotheses about the distribution of the signs of the coefficients. For a coefficient RQ[i] associated with the context $Cx_j$, we can therefore obtain the score Sj[i] by calculating the probability p[l][mk][i][|RQ[i]|] of correct prediction of the sign of the coefficient RQ[i].

Advantageously, the signs to be predicted are selected by thresholding the scores with which they are associated. Thus, for each RQ coefficient[i] that has a sign (i.e., not zero) and is associated with a $Cx_j$ context of score $S_j$, the sign is predicted if and only if $S_j$>Th, where Th is a predetermined threshold, for example equal to 0.7. For example, the Th threshold is known to the encoder and decoder.

Depending on a variant, the Th threshold can be selected during encoding and written to the compressed file or to the bitstream containing the encoded data representative of the digital image Im. For example, if the unit performing the encoding does not have enough computing resources at a given time, it is possible to increase this threshold Th in order to predict fewer signs, and therefore implement fewer calculations.

It would also be possible to vary the Th threshold according to the content of the images to be encoded: an image with a lot of content, such as large variations in brightness or many movements, would use a high threshold, and an image with little content, such as small variations in brightness or few movements, would use a lower Th threshold, so as to smooth out the complexity or memory required for encoding each image.

At the end of this selection, the signs of the selected RQ coefficients[i] are all associated with a context $Cx_j$ and a score $S_j$ higher than the predetermined threshold Th and form a set of SE elements EP of description to predict.

Advantageously, the description elements to be predicted EP are ordered into a SEP sequence. This order can be predefined, and for example correspond to the scanning order of the signs, as defined in the HEVC standard. Preferably, they are ordered according to their associated score. For example, if the score used is representative of a correct prediction probability, the elements are ordered by decreasing score. We obtain a sequence $Seq_i$ called initial, of description elements to predict. Suppose that at this stage we have M signs ordered to predict $Seq_i=\{EP_0=s_0, EP_1=s_1, \ldots, EP_{M-1}=s_{M-1}\}$.

In step E10, the ENP description elements that do not belong to the selected SE subassembly are encoded in a conventional way. This step implements encoding techniques known to the skilled person. For signs of the RQ coefficients[i] for example, it is known in particular from the HEVC standard, in particular from the article by Sole et al., already mentioned, that each sign is transmitted as a binary element 0 or 1, with a convention associating one with the plus sign and the other with the minus sign.

In E3, the different possibilities or hypotheses of combinations of values of the SEP sequence of elements to be predicted are evaluated, using a predetermined likelihood function V which can also be considered as the inverse of a CT cost function. We assume that we have K hypotheses $H_k$ or possible combinations, with K integer not zero. In the case where the description elements to be predicted are the M signs $S_m$ of a sequence, a sign can take the value + or −, the number of possible combinations is $K=2^M$.

For example, for a given hypothesis this function produces a cost, for example:

$$FV(\{s0=-, s1=+, s2=-, s3=-, \ldots, sM-1=+\})=CT=4240$$

Here, the $H_k$ hypothesis is $\{-, +, +, -, -, -, \ldots, +\}$ and the resulting cost is 4240. Of course, the likelihood function must ensure that a minimum cost is generated when the sign hypothesis is the most likely. There are several FV functions of likelihood/cost known to the state of the art and presented in the article by Koyama et al.

Advantageously, a likelihood function is used to measure the distortion along the left FG and upper FS boundaries of the current block with previously processed blocks. In relation to FIG. 6, an ID decoded image and a DVs virtual decoded block of size N×N pixels of this image were represented with the hypothesis of a combination of signs whose likelihood or cost is to be measured. DVs(lin,col) is the value of the pixel of the DVs block located on the linen line and the column neck of the block.

We consider a "Side Matching" operator $SM(\Im,B))$, with $\Im$ current image and C current block. It is defined as follows:

$$SM(\Im, C) = \sum_{a=0}^{N-1}(C(0,a)-\Im(lin-1, col+a))^2 + \sum_{a=0}^{N-1}(C(a,0)-\Im(lin+a, col-1))^2$$

with C(i,j) the value of the coefficients in the DVs decoded virtual block, with i, j integers between 0 and N−1.

FIG. 6 shows the pixels along the left border FG whose values are from bottom to top $y_1$ to $y_4$ and the pixels along the upper border FS of the DVs decoded virtual block whose values are from left to right $y_4$ to $y_7$, as well as the pixels $x_1$ to $x_4$ and $x_4$ to $x_8$ respectively located across the borders FG and FS.

Applying this operator is equivalent to forming the sum $(x_1-y_1)^2+(x_2-y_2)^2+(x_3-y_3)^2+(x_4-y_4)^2+(x_5-y_4)^2+(x_6-y_5)^2+(x_7-y_6)^2+(x_8-y_7)^2$.

The optimal DVopt virtual decoded block is determined that minimises this measurement:

$$DV_{opt} = \mathrm{argmin}_{DV_s} SM(ID, DV_S)$$

where ID represents the image reconstructed after decoding.

Alternatively, the likelihood function used minimises the error with a predictor block P of the current block. This consists in selecting the virtual decoded block that minimises the error with the predictor P.

The virtual residue associated with the optimal decoded virtual block is thus identified.

Of course, other likelihood or cost functions could be used, such as a criterion for minimising a distance/proximity measurement to a predetermined value, for example average or minimising the energy of the residual block.

To generate a decoded current block corresponding to a hypothesis of $H_k$ signs, proceed as follows:
- each coefficient of the current residual block is assigned its real sign (if it is a coefficient whose sign is not predicted), or the sign hypothesis (if it is a coefficient whose sign is to be predicted).
- using conventional dequantization and reverse transformation means, a decoded residue block is obtained, whose samples {r1, r2, . . . , r7} adjacent to the previously decoded blocks are added to the corresponding predicted elements of the P block to form the reconstructed elements y1=r1+p1, y2=p2+r2, y7=p7+r7 of the DV virtual decoded block, as shown in FIG. 6.

The virtual decoded block obtained DV is used to calculate the cost $CT_k$ associated with the estimated $H_k$ combination hypothesis.

In the following, we consider that the initial sequence $SEP_i\{s_0, s_1, s_2\}$ has 3 signs to predict. It is assumed that the actual values of the initial sequence are $s_0=-$, $s_1=+$ and $s_2=-$.

The $CT_k$ costs of the following 8 hypotheses are therefore estimated:

$CT_0 = FV(\{+,+,+,+\})$
$CT_1 = FV(\{+,+,+,-\})$
$CT_2 = FV(\{+,-,+\})$
$CT_3 = FV(\{+,-,-,-\})$
$CT_4 = FV(\{-,+,+,+\})$
$CT_5 = FV(\{-,+,+,-\})$
$CT_6 = FV(\{--,-,+\})$
$CT_7 = FV(\{-, -,-,-\})$

The combination H2 associated with the minimum cost $CT_2$ and therefore with the maximum likelihood $V_2$ is identified.

In E4, the sequence of SEP prediction elements is predicted using the identified H2 combination.

In E5, a value is derived from a corresponding IP prediction indicator. In this embodiment, an indicator of prediction per binary element of the SEB sequence is determined. To do this, the predicted value H2 is compared to the actual value of the SEB sequence. For example, for the first sign s0, the IP0 indicator indicates whether the predicted sign for s0 is equal to or different from the actual sign. For example, it is 0 if the predicted sign and the actual sign are equal, 1 if not. In this case, the predicted value is a +, the actual value is a −, so the IP indicator of the first sign s0 is set to 1. The same operation is performed for the other signs in the sequence. This results in a sequence of M prediction indicators, or sequence of sign residues.

The next step is to encode the sequence of prediction indicators obtained.

To do this, an entropic encoder is typically used, for example a Huffman encoder, an arithmetic encoder, a CABAC encoder as used in the HEVC standard. Indeed, since the prediction is performed with a probability of success greater than a threshold (in a preferred embodiment), there are more often 1s than 0s. This is used by entropic encoding to reduce the size of the compressed signal.

In general, the entropic encoder uses an encoding parameter representative of a probability density associated with the element to be encoded. Thus, if the element to be encoded is binary, the same entropic encoder will not be used if the two values of the binary element have a probability of occurrence of 0.9 and 0.1 respectively, or 0.6 and 0.4 respectively. Note that it is possible to use either two different entropic encoders (for example, two different Huffman encodes) or the same entropic encoder configured in two different ways (in the case of an entropic encoder that can be configured, such as the CABAC entropic encoder, for which two different contexts will be used).

In E6, a measure of DV disparity of likelihood values is evaluated.

In general, a disparity measurement is a measurement that is all the greater because the likelihood values are different from each other. Thus, for example, it is possible to use as a disparity measurement:
- the variance of the likelihood values;
- the standard deviation of the likelihood values;
- the absolute value of the difference between the largest and smallest of the likelihood values;
- the average of the absolute value of the differences between the likelihood values and their average; or
- the entropy of likelihood values.

According to the invention, in E7, at least one encoding parameter p is determined as a function of the evaluated DV disparity.

According to this embodiment of the invention, the parameter p is calculated as follows:

$$M = \max(V(+), V(-))$$

$$m = \min(V(+), V(-))$$

$$p = 0.5 + 0.5*(1 - m/M).$$

where V(+) denotes the likelihood of the sign + for the current sequence of binary elements, V(−) the sequence of the sign −.

Advantageously, when the entropic encoder is of the CABAC type, p is the probability used to initialize the CABAC context used to encode the IP information associated with each sign in the SEB sequence.

In one variant, the probability used to entropically encode the information is dependent on the predetermined interval in which a dependent value of V(+) and V(−) is located. Thus, the ratio R=M/m is calculated.

Based on this ratio, the probability of encoding the information is defined in advance as follows:

R→proba Table:
1<=R<2→p=0.5
2<=R<4→p=0.6
4<=R<8→p=0.7
8<=R<16→p=0.8
16<=R→p=0.9

According to another variant, an initial probability value p_init is derived from contextual information related to the sign to be predicted. For example, p_init may be equal to the probability p[l][mk][i][|RQ[i]|] of correctly predicting the sign of the RQ coefficient[i]. Then, the probability p to be used is calculated according to the value of p_init and V(+) and V(−). For example, we have:

$$p = p\_init * (\max(M/m, 2))$$

It is now assumed that the complementary information to be transmitted can take 4 different values: A, B, C, or D. If the measured DV disparity is less than a threshold T, the binary code used for encoding is, for example, the following:
A: 00
B: 01
C: 10
D: 11
However, if the disparity is greater than this threshold, another encode is used:
A: 0
B: 10
C: 110
D: 111
In this case, the disparity is used to determine an encoding parameter that comprises the identifier of a particular binary code or a particular encoder among a predetermined set of binary encodes or encoders.

In E8, the sequence of prediction indicators obtained using the entropic encoder configured with p is encoded.

In E9, the decoded block is constructed by applying to the quantized residue RQ dequantization and reverse transform steps (known per se). We obtain a decoded RD residual block. To RD is added the predictor block P to obtain the decoded block BD. During this step, the decoded BD block is also added to the reconstructed ID image. This allows a decoded version of the current image to be placed in the encoder. This decoded version is used in particular during the step of building a prediction of the signs selected to be predicted.

In E10 the sequence of encoded prediction indicators and the encoded sequence corresponding to the unpredicted description elements are inserted into the encoded data stream or bitstream TB.

In E11, we test if there is still a block to encode. If this is the case, steps E1 to E11 are repeated.

7.1.2 Variant Called "Mix-Incremental" Variant

In relation to FIG. 7, a variant of the previous embodiment is now presented whereby the invention applies to the first prediction element of a sequence of prediction elements.

At the end of step E2, there is a sequence of description elements to predict SEP.

The following steps are then performed in E3' according to a repeating loop that will be repeated as many times as the number M of description elements to be predicted selected in the SEP sequence. In E31' a current $Seq_c$ sequence is selected and initialised to the initial SEP sequence.

During the first iteration, the element to be predicted is the first element of the current sequence that includes M elements, for example the sign ED0=s0. In E33' the cost of the 2M possible hypotheses is estimated as already described and the combination associated with the minimum cost is identified. Suppose it is CT2.

During a step E34', the first element s0 of the current sequence $Seq_c$ is predicted by the value it assumes in hypothesis H2. In this example, this value is +.

In E35', the complementary information IC corresponding here to the corresponding IP prediction indicator is determined. To do this, the predicted value of s0 is compared to its actual value, as already described. In this case, the predicted value is a +, the actual value a −, so the IP indicator of the first sign ED0 is set to 1.

In E36', a measurement of the DV disparity of the likelihood values obtained for the plurality of hypotheses evaluated is evaluated.

In E37', at least one encoding parameter p is determined as a function of the evaluated DV disparity, as described above.

In E38', the IP indicator obtained is encoded with an entropic encoder configured by p.

In E39', we test if the first sign s0 is the last one of the current sequence. If this is the case, the processing of step E3' is finished, because the sequence only included one element. Otherwise, the SEP sequence is updated in E310' by deleting the first element ED0=s0.

Then, a second iteration of E3' is performed.

During the second iteration, the element s1, which became the first of the new current sequence, is processed. Steps E31' to E39' are repeated.

At this stage, two ways of carrying out stage E31' are envisaged:

A first option is to reuse the costs associated with the hypotheses in the previous sequence. It is therefore assumed that they were recorded in a memory. Among the K hypotheses of the first iteration, we eliminate those for which $s_0$ does not have its real value. We therefore only keep the 4 hypotheses CT4 to CT7 for which $s_0$ is −, and their associated costs:

$CT_4 = FE(\{-,+,+,+\})$ $CT_5 = FE(\{-,+,+,-\})$ $CT_6 = FE(\{--,-,+\})$ $CT_7 = FE(\{-,-,-,-\})$

Again, the one that obtains the minimum cost is identified. For example, it is assumed to be H6 with the cost $CT_6$.

A second option is to recalculate in E33' the costs associated with the combinations of the new current sequence. The new current $Seq_c$ sequence includes M=2 elements. There are $K=2^2$ possible combinations. The 4 hypotheses are therefore evaluated using a cost/likelihood function. It may be different from the one implemented in the first iteration. For example, a measurement of the energy of the coefficients of the decoded virtual residual block DVs is used and the hypothesis that minimises this measure is chosen. This cost function is more precise, but also more complex to calculate and therefore better adapted to shorter sequences.

It is understood that under this second option, combinations and costs calculated for a previous iteration do not need to be retained for the next iteration.

In E34', the sign $s_1$ is predicted to − which corresponds to its value in the selected combination.

In E35', the corresponding IP prediction indicator is calculated. The actual value of s1 being equal to +, the indicator IC is 1.

In E36', a measurement of the DV disparity of the likelihood values obtained for the plurality of hypotheses evaluated is evaluated.

In E37', at least one encoding parameter p is determined as a function of the evaluated DV disparity.

In E38', the IC indicator obtained for s1 is encoded with an entropic encoder configured by p.

In E39', we test if the sign s1 is the last of the current sequence.

This is not the case, so the current sequence is updated by deleting $s_1$. The current new sequence now only contains the sign $s_2$.

The third and last iteration is performed in a similar way.

In $E3_2'$, knowing that $s_0$ is − and $s_1$ is +, the remaining possible value combinations are $CT_4$ and $CT_5$. It is assumed that the minimum cost is $CT_5$. We therefore predict $s_2$ in E34' from the combination H4.

In E35', the corresponding prediction indicator IC is calculated. The actual value of s2 being equal to +, the IP indicator indicates a correct prediction and is 0.

In E36', a measurement of the DV disparity of the likelihood values obtained for the plurality of hypotheses evaluated is evaluated.

In E37', at least one encoding parameter p is determined as a function of the evaluated DV disparity.

In E38', the IC indicator obtained for s2 is encoded with an entropic encoder configured by p.

In E39', we test if there are any description elements left to be processed in the sequence. s2 being the last, the processing of the encoding step E3' is finished.

In the variant just presented, the iterations of step E3' apply to the first element of the sequence, which is updated by deleting the first element once processed. This embodiment has the advantage of reducing the length of the current sequence to be processed with each iteration.

However, the invention is not limited to this choice of implementation. Alternatively, the initial sequence can be maintained and the index of the current element can be increased with each new iteration of step E3'. In this case, the option of pre-calculating the costs associated with all possible combinations of values in the initial sequence and storing them is the most appropriate.

In a second embodiment of the invention, elements of description to be predicted of a type other than signs are selected. In particular, the description element M indicative of the INTRA/INTER prediction mode (in the HEVC standard, such a description element is called "pred_mode_flag"), the description element A indicative of the amplitude of the first quantised residual coefficient for the current block (in the HEVC standard, such a description element is called "coeff_abs_level_remaining") and the description element T indicates whether or not an inverse transform is used (in the HEVC standard, such a description element is called "transform_skip_flag").

In the HEVC standard, for example, an element M can take a value between 0 and 34. An element A can have values between 0 and $2^{16-1}$.

For the current block, the starting set consists of the description elements {M, A, T}. In this example, we consider that, for the current block C, and depending on the contextual information, it is found in step E2 that the score of T is lower than the necessary threshold Th, while M and A have a higher score. The SE subset is therefore {M,A}.

7.1.3 Decoding Method According to the First Embodiment of the Invention

In relation to FIG. 8, we now present the steps of the decoding method of a digital image encoded according to the first embodiment of the invention. It is assumed that a TB bitstream has been received by a decoding device implementing the decoding method according to the invention. Alternatively, the decoding device obtains a compressed FC file.

In D0, first select the first block to be processed as current block C'. For example, this is the first block (in lexicographical order). This block contains N×N pixels.

In D1, the current block C' is processed by implementing the decoding scheme, corresponding to the encoding scheme used by the encoder, for example as specified in the HEVC standard. In particular, during this step, a set of ED elements for describing the data to be decoded for the current block C' is identified.

In addition, a prediction P' of the block to be decoded C' is performed. The prediction information related to P' is read from the compressed and decoded bitstream or file. We therefore decode the prediction mode information.

The amplitude information of the residue to be decoded RQ' is also decoded and read from the bitstream or compressed and decoded file. We now know the amplitudes of the RQ'[i], but not yet the signs.

In D2, the invention-specific decoding method involves the step of selecting the description elements to be predicted from among the determined description elements. This step has already been described in detail for the encoding method in relation to FIGS. 2 and 3. The description elements to be predicted are advantageously selected based on predetermined scores. An SE set is obtained.

At the end of this step, we know the decoded values of the block description elements that were not predicted because they were associated with a Sj score below a predetermined Th threshold.

In step D3, the process reads the encoded data relating to the unpredicted current block description elements from the TB bitstream and decodes them.

In D4, the different possibilities or hypotheses of combinations of values of the SEP sequence of elements to be predicted are evaluated using the same likelihood function V as that used by the encoding method that produced the bitstream to be decoded.

In D5, the best hypothesis in the sense of a likelihood function is selected from the possible value combinations of the current $Seq_c$ sequence, as a prediction of the SEB sequence.

In D6, a measurement of the DV disparity of the likelihood values obtained for the plurality of hypotheses evaluated is evaluated.

In D7, at least one encoding parameter p is determined as a function of the evaluated DV disparity.

In D8, the IP information corresponding to the SEB sequence is decoded from the bitstream with an entropic decoder configured by p.

Then we move on to step D9 of rebuilding the current block C' from the decoded description elements, predicted EP (D5) and unpredicted ENP (D3), amplitude information of the coefficients of the residual block RQ' and the prediction P' obtained in D1.

To do this, the RQ' block is first de-quantized to obtain a de-quantized block. This is done by means adapted to the quantization used during encoding (scalar dequantization, vector dequantization . . . ), known to the skilled person.

Then an inverse transform of the one used for encoding is applied to the dequantized residue. The decoded residue is then obtained.

The decoded block BD' is reconstructed in D10 by adding the decoded residue to the prediction P'.

This block is integrated into the image being decoded.

During a D11 step, we come to test if the current block is the last block to be processed, taking into account the order of the blocks' paths, defined previously. If so, the decoding is complete. If not, the next step is step D0 to select the next block and the steps of the decoding method are repeated.

7.1.4 Decoding Method According to the "Mix-Incremental" Variant

According to this variant, illustrated in FIG. 9, the elements of the SE set obtained are ordered in D4' into an initial $Seq_i$ sequence, by decreasing scores, as already described for the encoding method.

A D5' step is implemented to evaluate the combination hypotheses of the selected SEB sequence. It includes the following sub-steps In D51' we consider a current $Seq_c$ sequence that we initialize to the initial SEB sequence.

The following steps (D52' to D57') form an iterative loop that will be repeated several times, depending on the number M of description elements to be predicted selected in the $Seq_c$ sequence.

In D52', the best hypothesis is selected in terms of a likelihood function FV, the same as that used by the encoding method that produced the bitstream to be decoded, among the possible value combinations of the current sequence $Seq_c$. As already mentioned for the encoding method, there are several possible evaluation functions. Subsequently, a distortion measurement along a border with previously processed blocks is considered and the combination of values that minimises this measurement is selected.

During a first iteration, the first description element of the $Seq_c$ sequence is decoded. In the following, it is assumed that the description elements are signs.

Using the cost function, the costs corresponding to each possible hypothesis or combination are generated for all the signs to be predicted. Thus, suppose that M=3, and Seqc={s0, s1, s2}. We will generate the following costs:
$CT_0$=FE({+,+,+,+})
$CT_1$=FE({+,+,+,−})
$CT_2$=FE({+,−,+})
$CT_3$=FE({+,−,−,−})
$CT_4$=FE({−,+,+,+})
$CT_5$=FE({−,+,+,−})
$CT_6$=FE({−−,−,+})
$CT_7$=FE({−,−,−,−})

These are the 8 costs corresponding to the 8 possible hypotheses on the signs to be predicted. It is assumed that the minimum cost is $CT_2$.

In D53', the value of the first sign s0 is predicted by its value in the combination H2. This is a plus.

In D54', a measure of the DV disparity of the likelihood values obtained for the plurality of hypotheses evaluated is evaluated.

In D55', at least one encoding parameter p is determined as a function of the evaluated DV disparity.

In D56', the IC prediction indicator corresponding to this first sign s0 is decoded from encoded data extracted from the bitstream or compressed file. This indicator indicates whether the predicted sign was correctly predicted or not. For example, it is assumed that the decoded value is a 1 and that it is associated with an incorrect prediction.

In D57, we deduce that the decoded value of the sign s0 is a −.

In D58', we test if the element s0 is the last one in the current sequence. If this is the case, the processing ends. Otherwise, the current sequence in D59' is updated by deleting the element s0 that has just been decoded.

During a second iteration, the second element s1, which became the first element of the current sequence, is processed.

In D52', we consider the combinations $Cb_k$, for which $s_0$ has its decoded value, the others being eliminated.

In the example considered, the actual value of ED0=$s_0$ is −, so the following costs are compared:
$CT_4$=FV({−,+,+,+})
$CT_5$=FV({−,+,+,−})
$CT_6$=FV({−−,−,+})
$CT_7$=FV({−,−,−,−})

These 4 costs correspond to the 4 possible hypotheses on the signs that remain to be predicted, knowing the decoded value of the one that has already been processed.

$H_6$ is identified as the minimum cost.

In D53', s1 is predicted by its value in the combination $Cb_6$, i. e. a −.

In D54', a measurement of the DV disparity of the likelihood values obtained for the plurality of hypotheses evaluated is evaluated.

In D55', at least one encoding parameter p is determined as a function of the evaluated DV disparity.

In D56', the corresponding indicator IC is decoded from the encoded data extracted from the bitstream or compressed file. An indicator is decoded, which indicates whether the predicted sign is equal to or different from the actual sign. In our example, let's assume that the decoded value of IP is 0, which means that the prediction of this sign s1 is correct.

In D57', we deduce that s1 is −.

In D58', we test if s1 is the last element. As this is not the case, the current sequence is updated to D59', by deleting s1. The new Seqc sequence is reduced to element s2.

During a third and last iteration, the last sign s2 is decoded.

In D52', we consider the value combinations of the initial sequence $Seq_i$ for which the description elements already processed s0 and s1 take their decoded value.

The following costs are therefore compared:
$CT_6$=FE({−−,−,+})
$CT_7$=FE({−,−,−,−})

$CT_6$ is identified as the minimum cost.

Then, the last sign $s_2$ in the predefined order is predicted, in $D4_3'$, by its value in the combination $H_6$: it is a +.

In D53', a measurement of the DV disparity of the likelihood values obtained for the plurality of hypotheses evaluated is evaluated.

In D54', at least one encoding parameter p is determined as a function of the evaluated DV disparity.

Then, an IC indicator associated with the sign $s_2$ is decoded to D56'. It indicates whether or not the sign $s_2$ was correctly predicted. In our example, let's assume that the decoded value is 0, which corresponds to a correct prediction.

We deduce in D57' that the decoded value of $s_2$ is the + sign.

In D58', we can see that $s_2$ is the last element to be treated.

As with encoding, it should be noted that the invention is not limited to the embodiment that has just been presented. Other implementation choices can be made, such as keeping the sequence at its initial length, updating the index of the current element, initialised to the first $ED_0$ description element and terminating iterations after the last $ED_{M-1}$ element has been processed.

Then we move on to step D6' of reconstruction of the current block C' from the decoded description elements, predicted EP and unpredicted PVR, amplitude information of the coefficients of the residual block RQ' and the prediction P' obtained in D1', as already described in the first embodiment.

According to this variant of the invention, since all the elements of the initial sequence selected according to the predetermined scores are predicted, we know from the end of step D2 how many IP prediction indicators are to be extracted from the bitstream or the compressed file. It is understood that this makes it possible to implement an implementation of the invention that unravels the operations of reading and analysing the encoded data contained in the bitstream or parsing compressed file from the processing operations of the current block according to the encoding/decoding scheme implemented. For example, the decoding could be organised using one specific component for the analysis/reading of the encoded data in the bitstream and another for the reconstruction operations of the decoded blocks. An advantage of this parsing independence is that it allows the decoding operations to be parallelised.

7.2 DESCRIPTION OF A SECOND EMBODIMENT OF THE INVENTION

In relation to FIG. 10, a second embodiment of the invention is now described, according to which the invention-based encoding method consists of two phases, a first phase of forming a first portion of TB1 encoded data streams and a second phase of forming a second portion of TB2 streams.

7.2.1 Formation of a First Bitstream Portion

During encoding, the Im image is subdivided into blocks of variable size whose processing order is known to the encoder and decoder. Each block will undergo an encoding operation consisting of a series of operations (application of prediction steps, residue calculation, quantization, entropic encoding) which will be detailed later.

In a step C0 the first block to be processed is selected as current block B. In a preferred embodiment, this is the first block (in lexicographical order).

In step C1, this block B will be encoded in a classic way, for example as described in the HEVC video encoding standard.

This step typically consists of predicting the current block using previously processed pixels in the same image or in a previously processed image, producing a residue representative of the difference between the prediction and the true pixel values of the current block, transforming this residue by frequency transform such as a DCT for example, quantizing this transformed residue. Each of these operations (not exhaustive) is likely to produce descriptive elements that are indicative values, for example, of the type of prediction used, the type of transform used, the division of the current block into subblocks, the value and sign of the quantised residues, etc.

In a C2 step, each description element is then encoded by entropy encoding, for example of the CABAC type as specified in the HEVC standard. This step therefore transforms the description elements into a sequence of binary symbols 0 and 1, which represents the current block.

The sequence of binary elements from the entropy encoding step is added after an intermediate TB0 bitstream, including the encoded data of the blocks already processed.

In step C3, it is determined which would be the first bit for the current block that would need to be read in the intermediate bitstream if an attempt were made to decode this bitstream from conventional means such as a HEVC decoder. Depending on how the invention is made, a PF0 bitstream pointer is used during decoding, which is moved as encoded data is read into the bitstream.

This C3 step can be performed when encoding the said current block, or by simulating its decoding.

Then, a sequence of SEB binary elements is identified. These are the consecutive bits located after (and including) the first bit and before the last bit that must be read to decode the current block, within the limit of M bits, where M is a fixed number. Thus, let us take an example where M is 4, for the current block, the sequence of binary elements SEB is 1011 for example. Note that if the current block is encoded on less than M bits, the SEB sequence itself contains less than M bits.

In an alternative embodiment, the M binary elements of the SEB sequence are the M last bits read when decoding the current block.

In a C4 step, the determined sequence of SEB binary elements is removed from the intermediate bitstream TB0 and the remaining binary elements are added to a second TB1 bitstream, which will then be referred to as the first bitstream portion. In other words, the second TB1 bitstream is therefore formed for each block of the binary elements of the first TB0 bitstream that were not removed from TB0 in step C4.

Note that in an alternative embodiment, it is possible to combine this step with the previous one: in this case, an intermediate TB0 bitstream is not used, but the binary elements representative of the encoded data of the current block except the EB bits are written directly into the first TB1 stream portion.

During a C5 step, it is tested whether the current block is the last block to be processed by the encoder, taking into account the path order defined previously. If so, the next step is to select the first block. If not, the next step is the E1 encoding step of the new current block into syntax elements.

During a step C0, the next block B is selected to be treated according to the procedure just described. This block becomes the current block to be processed, and the next step is the prediction step.

At this point, all blocks of the current image were processed a first time and some of the encoded data for the current block was inserted into the first stream portion TB1.

7.2.2.2 Formation of a Second Portion of Encoded Data Streams

During a second phase of the encoding method according to the invention, a second portion of TB2 bitstream is formed as follows:

In this step C0' the first block to be processed is selected as current block B. In the preferred embodiment, this is the first block (in lexicographical order).

In step C1', the $2^N$ sequences of N possible binary elements, or hypotheses, are evaluated to replace the sequence of EB binary elements that has been removed from the bitstream TB0 for the current block. The objective is to go through all the hypotheses and reconstruct the current block for each of them. For example, if EB contains 4 bits, 16 hypotheses will be tested.

In C11', a hypothesis, distinct from those previously processed, is selected for the EB bits associated with the current block. It is assumed, for example, that the $2^N$ hypotheses are arranged in an order of increasing value of the number formed by the sequence of binary elements.

In the case where N is 4, we have:
Hypothesis number 0, H(0)=0000
Hypothesis number 1, H(1)=0001
Hypothesis number 2, H(2)=0010
. . . .
Hypothesis number 15, H(15)=1111

The first hypothesis tested is therefore hypothesis H(0)=0000.

In a sub-step C12' the current block B' is decoded using the binary element values of hypothesis number H(i) the sequence EB.

In relation to FIGS. 11, 12 and 13 we consider an exemplary embodiment according to which the EB binary elements were extracted from the first binary element representative of the current block. It is assumed that this position is pointed to by a first PF1 bitstream pointer. It corresponds to a reading position of binary elements of the TB1 bitstream.

The decoding operation therefore consists in decoding the syntax elements of the block from at least part of the EB bits of the current hypothesis followed (if applicable, because the decoding of the block can be completed beforehand) of the binary elements of the first portion of TB1 bitstreams relative to the current block. This decoding produces a sequence of SED(i) description elements, where i is the number of the current hypothesis.

In the example in FIG. 11, the sequence of binary elements H(i) is completely read as well as the binary elements of the first bitstream portion associated with the current block, starting from the position of the PF1 pointer.

In the example in FIG. 12, the sequence of binary elements H(i) is not completely read, because the decoder built into the encoder has obtained the values of the description elements it needs using the first bits of the sequence under this hypothesis and therefore did not need them. It can therefore be assumed that hypothesis H(i) does not correspond to the bit sequence extracted from TB0.

In the example in FIG. 13, the sequence of EB(i) binary elements is completely read, as well as binary elements of the first bitstream portion beyond the limit of the encoded data of the current block. It can therefore be assumed that hypothesis H(i) does not correspond to the bit sequence extracted from TB0.

At the end of this decoding, we have the sequence of SED(i) description elements for hypothesis i.

In a sub-step C13' for hypothesis H(i), a decoded version VB(i) of the current block is reconstructed. It is constructed from the SED(i) description elements read in the first bitstream portion and/or in the sequence that corresponds to the hypothesis.

In a C14' sub-step, a cost (or likelihood) associated with each decoded version of the VB(i) current block is evaluated.

For example, in relation to FIG. 14, this evaluation consists of extrapolating a series of values $\{rj\}$ as follows. Let's suppose that the current block is a block of 4×4 pixel size. The pixels immediately to the left and above the current block are called A1, A2, . . . , A8. The pixels on the left and above the pixels A1, A2, . . . , A8 are called B1, B2, . . . , B8. The extrapolated $\{rj\}$ values are calculated as follows:

$r1 = 2 \cdot A1 - B1$ $r2 = 2 \cdot A2 - B2$ $r3 = 2 \cdot A3 - B3$ $r4 = 2 \cdot A4 - B4$ $r5 = 2 \cdot A6 - B6$ $r6 = 2 \cdot A7 - B7$ $r7 = 2 \cdot A8 - B8$ Then, the CT(i) cost of hypothesis H(i) is calculated as follows:

$CT(i) = |r1-X1| + |r2-X2| + |r3-X3| + |r4-X4| + |r5-X5| + |r6-X6| + |r7-X7|$

Where X1, X2, X3, X4 are the pixel values of the first column of the block VB(i) and X4, X5, X6, X7 are the pixel values of the first line of this block.

We see that this cost measure is representative of a discontinuity along the block boundaries.

In alternative embodiments, other cost measures are possible. For example, we can choose the sum of the inter-pixel differences of all the pixels inside the block. Alternatively, an energy can be calculated from the residue of the current block.

A likelihood measurement $V(i) = -CT(i)$ is derived from this. The higher the cost of the H(i) hypothesis, the less likely the hypothesis is.

During a sub-test step (not shown) we will check if the current hypothesis H(i) is the last hypothesis to be tested on the EB bits. In a preferred embodiment where we test the binary values in the classical ascending order, this test consists in checking if the value contains only 1.

If the current hypothesis is not the last, return to step C13' to test the next hypothesis.

If the current hypothesis is the last, the hypotheses are ranked in descending order of likelihood.

In C4', characteristic information IC(i) of the SEB sequence is determined.

In a first embodiment of the invention, the sequences tested are sorted according to a decreasing likelihood measurement order and in a step C42' the value of characteristic information IC of the EB binary element sequence corresponding to a rank of the correct hypothesis H(i) (i.e. the value H(4)=1011 in our example) is determined in a table containing all the hypotheses classified by increasing cost or by decreasing likelihood measurement. Thus, we can find that hypothesis 1011 is the 4th among the 16 combinations classified by increasing cost. The IC characteristic information of the SEB sequence associated with the current block will then be assigned the value 4.

Of course, other types of characteristic information can also be used. Thus, according to a variant, the sequence S(i) that corresponds to the most likely hypothesis H(i), i.e. the one with the lowest cost, is identified. Then, the EB and S sequences (i) are compared bit by bit in E92', and characteristic information IC =BDIFF is constructed to represent the equality or inequality between the bits. For example, we can start by comparing the values of the highest weight bit of EB and SEB(i), and transmit BDIFF=0 if they are different and BDIFF=1 if they are equal. Then, the same process is applied to the second high weight bit, and the method is repeated up to the low weight bit. It can be seen that most often, the bits are equal. BDIFF therefore more often takes the value 1 than 0.

In a C5' step, the value of the characteristic information IC determined is encoded using an entropic encoder set by the parameter p.

A measurement of the DV disparity of the likelihood values obtained for the plurality of hypotheses evaluated is evaluated in C2'.

For example, the DV disparity is calculated from the variance of the CT(i) costs.

Indeed, it can be seen that if all CT(i) costs are close to each other (low variance), it will be difficult to distinguish the right combination from each other. On the other hand, if the costs are very different from each other (high variance), it will be easier to identify this combination.

As a result, the complementary information, which is the value transmitted by the encoder to the decoder, will not have the same probability of being low: if the variance is low, the rank is less likely to be small than when the variance is high. However, it is essential, in order to best compress this rank, to know exactly its probability of being low.

In C3', at least one encoding parameter p is determined as a function of the evaluated DV disparity. In this example, instead of using a single entropic encoder to encode the rank, we will use, for example, 10 different entropic encoders, predetermined according to the variance of the CT(i) costs. We define 10 groups of values of this variance, we identify a group according to the variance value obtained for the current block:

For example:
If $0 \leq V < 10$, the current block belongs to group 1,
If $10 \leq V < 20$, the current block belongs to group 2,
If $20 \leq V < 40$, the current block belongs to group 3,
If $40 \leq V < 80$, the current block belongs to group 4,
If $80 \leq V < 160$, the current block belongs to group 5,
If $160 \leq V < 320$, the current block belongs to group 6,
If $320 \leq V < 640$, the current block belongs to group 7,
If $640 \leq V < 1280$, the current block belongs to group 8,
If $1280 \leq V < 2560$, the current block belongs to group 9,
If $2560 \leq V$, the current block belongs to group 10, Depending on the group, a different encoder is determined to encode the rank. The p parameter therefore includes an encoder identifier associated with the group.

For example, if the entropic encoder used is of the Huffmann encoding type, then a specific encode table (associating a Huffman encode with each possible layer value) is associated with each group. Similarly if the entropic encoder is of the CABAC type, then a different CABAC context will be used for each group. The encoded value is then inserted into the second portion of the TB2 bitstream.

With regard to the IC=DS embodiment, the cost associated with the correct combination tends to be low, so the value of DS is often small. We therefore have a non-uniform statistical distribution of DS occurrences over all possible values, which makes it possible to reduce the bitstream rate by using a conventional entropic encoder (Huffman encoding, arithmetic encoding), adapted to the DS statistics.

With regard to the embodiment IC=BDIFF, the most likely sequence is generally close to the correct sequence so that the bit-to-bit difference has a value that is often small. The statistical distribution of occurrences is also non-uniform in this case, which allows the entropic encoder to perform effective compression.

During a C6' step, it is tested whether the current block is the last block to be processed, taking into account the path order defined previously. If so, the next step is step C7' of concatenation of the first and second TB1 and TB2 bitstream portions. If not, the next step is C0' to select the next block.

7.2.3 Concatenation of Binary Trains

In this step C7' the first and second bitstream portions TB1 and TB2 will be concatenated to form the final TB3 bitstream which can then be stored or transmitted to the decoder. Concatenation can be done by juxtaposition as shown in FIG. 13, or by multiplexing the bits of the TB1 and TB2 streams, or by any other way to combine the two streams, provided that it allows the decoder to distinguish them.

This step may also include the insertion into the final TB3 bitstream of information to identify the location of the second portion of the TB2 bitstream. For example, if TB1 and TB2 bitstreams are juxtaposed in this order, information will be inserted before the start of the first TB1 bitstream to indicate where the start of the TB2 bitstream is located in the final TB3 data bitstream. For example, it is a FL2 flag that includes an address corresponding to the beginning of the second TB2 portion.

7.3 DESCRIPTION OF A METHOD FOR CARRYING OUT A DECODING METHOD ACCORDING TO THE INVENTION

In the following, we consider a decoder that has received the bitstream TB3 produced by the invention-specific encoding method and we describe a decoding method according to the invention in relation to FIG. 15.

7.3.1 Identification of the First and Second TB1, TB2 Portions in the TB3 Bitstream In this step D00, the first stream portion TB1 comprising at least some of the encoded data of the image blocks and a second stream portion TB2 comprising the characteristic information IC of the missing binary element sequences in the first stream portion will be identified.

In relation to FIG. 16, it is assumed that the first and second bitstream portions are juxtaposed, with TB1 followed by TB2 and FL2 information representative of a start position of the second TB2 bitstream portion in the complete TB3 bitstream is read from the TB3 bitstream. Thus, technically, the decoder uses in a traditional way a first PF1 file pointer whose position is initialised at the beginning of the TB3 bitstream and which moves in the first bitstream portion as the decoding progresses and, according to the invention, a second PF2 file pointer whose position is initialised at the address indicated by the FL2 flag and which moves in the second bitstream portion as the decoding processes.

In a step D0 the current block C' to be decoded is selected.

7.3.2 Data Processing of the First Bitstream Portion for the Current Block

This involves finding the sequence of SEB binary elements deleted from the bitstream by the encoder. It is considered to include M binary elements, with M being a non-zero integer.

In this step D1, the $2^M$ sequences of M binary elements or hypotheses H(j) possible with j integer between 1 and $2^{M-1}$ are evaluated. The objective is to go through all the hypotheses. For example, if the EB subset contains M=4 bits, 16 hypotheses will be tested.

For example, the hypotheses are examined in a predetermined order as already described for the encoding method according to the second embodiment of the invention and the following sub-steps are carried out:

In a step D11, an H(j) hypothesis is obtained.

We obtain a hypothesis, among the hypotheses not yet processed.

In D12, the description elements corresponding to the current hypothesis H(j) are decoded.

It is assumed in the following that the sequence of M EB binary elements was extracted by the encoder at the beginning of the encoded data of the current block B. The decoder reproduces the operation of the encoder and begins by decoding the binary elements of the sequence of the current hypothesis H(j) to determine the values of the SED(j) description elements it needs to decode the current block.

Several scenarios may arise:

The decoder has not decoded all the syntax elements it needs from the N binary elements of the sequence H(j). It continues its decoding by reading the data from the first portion of the TB1 stream from the current position of the PF1 pointer that it moves as it is read, The decoder has decoded all the syntax elements it needs for the current block from the N binary elements of the sequence H(i). In this case, it does not move by the PF1 pointer and does not read information in the first TB1 bitstream portion;

The decoder has decoded all the description elements it needs from the first M<N binary elements of the sequence H(i). It only keeps these and if the sequence H(i) is found to be the correct hypothesis, it only inserts these into the first portion of the TB1 bitstream.

Note that this step generally includes a sub-step of entropic DE decoding of the binary elements read in the H(j) hypothesis or in the first portion of TB1 stream.

In a sub-step D13, for hypothesis H(j), a decoded version VB(j) of the current block is reconstructed. It is based on the SES(j) description elements determined in D12. For example, in a HEVC-type decoding scheme, the description elements determined make it possible to obtain a residue of the current block that is added to a prediction of this block made from neighbouring blocks already decoded and reconstructed.

Similar to that described for the encoding method, a likelihood measurement V(j) associated with the current hypothesis H(j) is calculated in a sub-step D14. In one embodiment, this measure is chosen equal to the opposite of a cost representative of a discontinuity at the boundaries of the current block with neighbouring blocks already treated and reconstructed.

In D15, we test whether there are any hypotheses left to evaluate.

Once all the hypotheses have been processed, the description elements associated with the current block and a likelihood measurement are available for each of them.

In D2, similar to that described for the encoder, the hypotheses are sorted into D2 from most likely to least likely. This forms an ordered list in order corresponding to a decreasing likelihood measurement.

According to a variant, corresponding to the one described for the encoder, the most probable hypothesis, i.e. the one that maximises the evaluated likelihood measurement, is determined in D2'.

In D3, a disparity in the likelihood measurements obtained is calculated. In D4, at least one parameter Pa of a decoder is determined as a function of the calculated DV disparity.

During a step D5, complementary information IC representative of the SEB sequence to be decoded is read from the second TB2 bitstream portion. In relation to FIG. 16, the decoder starts reading from the current position of the PF2 pointer of the second bitstream portion. It therefore performs a classic DE entropic decoding in D5, for example of the CABAC type, using the decoder configured using parameter Pa to decode the value of the IC information characteristic of the sequence extracted by the encoder.

According to a first option, the IC information is a DS rank.

According to a second option, the IC information is a bit-by-bit difference with the most likely sequence determined.

In a sub-step D6, the correct hypothesis H(j0) for the EB bits is identified from the decoded characteristic information IC. According to the first option, it corresponds, in the ordered list of hypotheses, to the one with the rank DS. According to the second option, it corresponds to the hypothesis H(j0) whose sequence of binary elements has a bit-by-bit difference with the most likely sequence that is equal to IC.

In a step D7, at least part of the determined EB bits are inserted into the first TB1 stream portion at the location where they were deleted by the encoder.

Note that if, when determining the description elements SED(j), the decoder did not need to read all the binary elements of the sequence H(j0) to decode the syntax elements of the current block, then, to complete the first portion of the TB1 bitstream, it only retains the binary elements of the correct hypothesis H(j0) that it actually used. In other words, the sequence of binary elements determined as the correct hypothesis includes a number of elements smaller than the predetermined number N, which corresponds to the example already described in FIG. 12.

In this embodiment, a new complete encoded data stream TB1' is reconstructed from the first stream portion TB1 received and the binary element sequences associated with each block.

Note that this step D7 of rebuilding a complete bitstream TB1' is optional, as the description elements associated with the current block have already been decoded and the pixels of the current block already rebuilt.

They can simply be stored in a memory MEM2 so that the current reconstructed image can be displayed.

Nevertheless, it should be noted that there are finite state entropic decoders. These decoders have internal variables. When decoding a part of a bitstream, the decoded value depends on the value of the internal variables, and the internal variables are updated and therefore modified if necessary. An example of entropic finite state decoding is the CABAC decoder used in the HEVC standard. When using a finite state entropic decoder, it must be ensured that the entropic decoder returns to the state it reached when decoding the current block before starting the next block. To do this, two options can be considered:

or reform the complete bitstream TB1 as previously described in order to allow the entropic decoder to completely decode the binary elements corresponding to each block and in this way restore the state it had reached for the correct hypothesis;

either memorise, in addition to the description elements, or the decoded pixels for the current block, the state of the entropic decoder corresponding to each hypothesis, so that the entropic decoder repositions itself on the state corresponding to the correct hypothesis before starting to decode the next block.

In step D8, we test whether the current block is the last block to be processed by the decoding unit. If so, the encoder has completed its processing. If not, the next step is to select the next block D0.

This block becomes the current block to be processed, and the next step is step D1 to evaluate the hypotheses.

At the end of these steps, all the blocks were processed and the portion of the bitstream TB1' thus reconstructed corresponds to the intermediate data bitstream TB0 described in the encoding method implementation mode.

In the event that step D5 of reconstructing a completed bitstream TB1' is not implemented, the entropic decoder is positioned on the AND state associated with the correct hypothesis H(j0) for the block just processed.

During a D9 step, the bitstream TB1' is decoded using traditional means, such as decoding according to the HEVC standard. This step is optional. It only concerns the case where the D7 reconstruction phase has been implemented.

In D10, the current block is rebuilt.

The bitstream TB is intended to be presented as an input to a local or remote decoder. For example, a signal carrying the bitstream is transmitted to the decoder via a communication network.

It should be noted that the invention just described can be implemented by means of software and/or hardware components. For this purpose, the terms "module" and "entity", used in this document, may refer either to a software component, a hardware component or a set of hardware and/or software components capable of implementing the function(s) described for the module or entity concerned.

In relation to FIG. 17, an example of a simplified structure of a device 100 for encoding a digital image according to the invention is now presented. The device 100 implements the encoding method according to the invention just described in its different embodiments.

For example, device 100 includes a processing unit 110, equipped with µ1 processor, and controlled by a computer program $Pg_1$ 120, stored in a memory 130 and implementing the method according to the invention.

On initialization, the encode instructions of the computer program $Pg_1$ 120 are for example loaded into RAM memory before being executed by the processor of the 110 processing unit. The processor of the 110 processing unit implements the steps of the method described above, according to the instructions of the 120 computer program.

In this exemplary embodiment of the invention, the device 100 includes a computing machine dedicated to or configured for:

Evaluating (EVAL) a plurality of value hypotheses of at least one description element of the current block by calculating a likelihood measurement per hypothesis;

Calculating (CALC DV) a disparity of the obtained likelihood measurements;

Determining (DET Pa) at least one parameter of an encoder according to the calculated disparity;

Determining (DET IC) information representative of a relationship between the value of said at least one description element for the current block and at least one hypothesis of the plurality of hypotheses;

Encoding (COD IC) the information determined using the parameterised encoder; and Inserting (INSERT) the encoded information into the stream.

Advantageously, according to the first embodiment of the invention, device 100 is configured to predict said at least one description element by selecting the value hypothesis associated with the highest likelihood measurement, called the predicted value, to determine the information as a difference between the predicted value and the value of the description element, called the residual value, and to reconstruct the block by adjusting the predicted value using the residual value.

In the second embodiment, device 100 is configured to rank the hypotheses in descending order of likelihood and to determine the information to be encoded as a rank in the ranking.

The 100 device also includes a BD1 unit for storing the obtained likelihood measurements, calculated disparities and determined encoding parameters.

These units are controlled by processor µ1 of the 110 processing unit.

In relation to FIG. 17, an example of a simplified structure of a device for decoding a digital image according to the invention is now presented. The device 200 implements the decoding method according to the invention that has just been described in its different embodiments.

For example, the device 200 includes a processing unit 210, equipped with a µ2 processor, and controlled by a computer program $Pg_2$ 220, stored in a 230 memory and implementing the process according to the invention.

On initialisation, the encode instructions of the computer program $Pg_1$ 220 are for example loaded into RAM memory before being executed by the processor of the processing unit 210. The processor of the 210 processing unit implements the steps of the method described above, according to the instructions of the computer program 220.

In this exemplary embodiment of the invention, the device 200 includes a computing machine dedicated to or configured for:

Evaluating (EVAL) a plurality of value hypotheses of at least one description element of the current block by calculating a likelihood measurement per hypothesis;

Calculating (CALC DV) a disparity of the obtained likelihood measurements;

Determining (DET p) at least one parameter of an encoder according to the calculated disparity;

Decoding (DEC IC) complementary information identifying at least one of these hypotheses;

Obtaining the value of said at least one description element for the current block from said at least one identified hypothesis.

Advantageously, according to the first embodiment of the invention, device 200 is configured to predict said at least one description element by selecting the value hypothesis associated with the highest likelihood measurement, called the predicted value, to determine the information as a difference between the predicted value and the value of the description element, called the residual value, and to reconstruct the block by adjusting the predicted value using the residual value.

In the second embodiment, the 200 device is configured to classify the hypotheses in descending order of likelihood, to interpret the decoded information as a ranking in the ranking, to identify the hypothesis associated with that ranking, and to determine the value of said at least one element of description as that of the identified hypothesis.

The 200 system also includes a BD2 unit for storing the obtained likelihood measurements, calculated disparities and determined decoding parameters.

These units are controlled by processor µ2 of processing unit 210.

The 100 and 200 devices can be advantageously integrated into a TU user terminal. They are then arranged to cooperate with at least the following modules of the TU terminal:

a data transmitting/receiving I/O module, via which the TB bitstream or the FC compressed file is transmitted in a telecommunications network, for example a wireline network or a wireless network, respectively received;
a DISP display module for the decoded images.

Thanks to its good performance, and in particular a compression gain of around 1%, the invention just described in its various modes of production applies to any video compression scheme per block. In particular, the encoding and decoding methods described above can be integrated into standard video encoders/decoders such as H.266, HEVC/H.265, AVC/H.264 or a future Post-HEVC standard, or into any type of proprietary video encoders/decoders. The invention-specific encoding and decoding methods also apply to all types of still image encoders/decoders.

An exemplary embodiment of the present application improves the situation of the prior art.

An exemplary embodiment overcomes the disadvantages of prior art.

An exemplary embodiment proposes a solution that will improve compression performance.

It goes without saying that the methods of implementation described above have been given for information only and in no way restrictive, and that many modifications can easily be made by a person having ordinary skills in the art without going beyond the scope of the invention.

The invention claimed is:

1. A method for decoding an encoded data stream representative of at least one image, said image being divided into blocks, wherein the decoding method comprises, for a current block, the following acts performed by a decoding device:
    calculating a measurement per possible value among a plurality of possible values of at least one description element of the current block, said calculation being a same calculation as that used to encode the data bitstream;
    calculating a disparity of the obtained measurements;
    determining at least one parameter of an entropy decoder as a function of the calculated disparity,
    decoding, using an entropy decoder configured by said at least one parameter, complementary information for identifying at least one of said possible values; and
    identifying at least one of the possible values using at least the decoded complementary information and obtaining a value of said at least one description element for the current block, from said at least one identified possible value.

2. A method for encoding a data stream representative of at least one image, said image being divided into blocks, wherein the method comprises the following acts, implemented for a current block by an encoding device:
    calculating a measurement per possible value among a plurality of possible values of at least one description element of the current block;
    calculating a disparity of the obtained measurements;
    determining at least one parameter of an entropy encoder according to the calculated disparity, and
    encoding information using an entropy encoder configured by said at least one parameter; and
    inserting the encoded information into the stream.

3. The method according to claim 1, further comprising classifying hypotheses in decreasing likelihood order, wherein the complementary information includes a rank in the classification and the value of said at least one description element corresponds to the hypothesis classified in said rank.

4. The method according to claim 1, further comprising predicting the value of said at least one description element by selecting, among the possible values, a possible value associated with a highest measurement among said measurements and referred to as a predicted value, and wherein the complementary information comprises a difference between the predicted value and the value of said at least one description element.

5. The method according to claim 3, further comprising evaluating a plurality of possible values of a sequence of at least two description elements, wherein for the first element of the sequence, the calculating of the disparity comprises calculating a disparity of the measurements obtained for the plurality of possible values of the sequence and wherein the value of the first description element of the sequence matches that of the identified possible value.

6. A device for decoding an encoded data stream representative of at least one image, said image being divided into blocks, wherein the device comprises a computing machine configured for or dedicated to:
    for a current block:
        calculating a measurement per possible value among a plurality of possible values of at least one description element of the current block;
        calculating a disparity of the obtained measurements;
        determining at least one parameter of an entropy decoder according to the calculated disparity,
        decoding using an entropy decoder configured by said at least one parameter complementary information for identifying of at least one of said possible values; and
        identifying at least one of the possible values using at least the decoded complementary information and obtaining the value of said at least one description element for the current block, from said at least one identified possible value.

7. A device for encoding a data stream representative of at least one image, said image being divided into blocks, wherein the device comprises a computing machine configured for or dedicated to:
    for the current block:
        calculate a measurement per possible value among a plurality of possible values of at least one description element of the current block;
        calculate a disparity of the obtained measurements;
        determine at least one parameter of an entropy encoder as a function of the calculated disparity, encoding using an entropy encoder configured by said at least one parameter information for identifying at least one of said possible values; and
        insert the encoded information into the bitstream.

8. The device according to claim 6, wherein the device is implemented in a terminal equipment for a communication network.

9. The method according to claim 1, further comprising the decoding device receiving the current block from a communication network or a non-transitory computer-readable medium.

10. The method according to claim 2, further comprising the encoding device transmitting the stream on a communication network or store the stream in a non-transitory computer-readable medium.

11. The method according to claim 2, further comprising classifying possible values in increasing cost order, wherein the complementary information includes a rank in the classification and the value of said at least one description element corresponds to the possible value classified in said rank.

12. The method according to claim 3, further comprising predicting the value of said at least one description element by selecting, among the possible values, a possible value associated with a lowest cost measurement and referred to as a predicted value, and wherein the complementary information comprises a difference between the predicted value and the value of the description element.

13. The method according to claim 4, further comprising evaluating a plurality of possible values of a sequence of at least two description elements, wherein for the first element of the sequence, the calculating of the disparity comprises calculating a disparity of the measurements obtained for the plurality of possible values of the sequence and wherein the value of the first description element of the sequence matches that of the identified possible value.

14. The device according to claim 6, wherein the computing machine is configured for or dedicated to receive the current block from a communication network or a non-transitory computer-readable medium.

15. The device according to claim 7, wherein the computing machine is configured for or dedicated to transmit the stream on a communication network or store the stream in a non-transitory computer-readable medium.

16. The device according to claim 7, wherein the device is implemented in a terminal equipment for a communication network.

17. The method according to claim 1, wherein said at least one parameter belongs to a group consisting of:
- a parameter comprising a context associated with an adaptive binary arithmetic decoder;
- a parameter comprising a probability associated with the complementary information for identifying at least one of these possible values;
- a parameter comprising an identifier of a predetermined decoder.

18. The method according to claim 2, wherein said at least one parameter belongs to a group consisting of:
- a parameter comprising a context associated with an adaptive binary arithmetic encoder;
- a parameter comprising a probability associated with complementary information for identifying at least one of these possible values;
- a parameter comprising an identifier of a predetermined encoder.

19. The device according to claim 6, wherein said at least one parameter belongs to a group consisting of:
- a parameter comprising a context associated with an adaptive binary arithmetic decoder;
- a parameter comprising a probability associated with the complementary information identifying at least one of said possible values;
- a parameter comprising an identifier of a predetermined decoder.

20. The device according to claim 7, wherein said at least one parameter belongs to a group consisting of:
- a parameter comprising a context associated with an adaptive binary arithmetic encoder;
- a parameter comprising a probability associated with complementary information identifying at least one of said possible values;
- a parameter comprising an identifier of a predetermined encoder.

* * * * *